(12) United States Patent
Verma

(10) Patent No.: US 10,279,944 B2
(45) Date of Patent: May 7, 2019

(54) APPLICATOR SYSTEMS FOR MOUNTING STRIP-LIKE FITMENTS TO FLEXIBLE PACKAGING

(71) Applicant: ProAmpac Intermediate, Inc., Cincinnati, OH (US)

(72) Inventor: Vishaal Boehm Verma, Evanston, IL (US)

( * ) Notice: Subject to any disclaimer, the term of this patent is extended or adjusted under 35 U.S.C. 154(b) by 395 days.

(21) Appl. No.: 15/080,196

(22) Filed: Mar. 24, 2016

(65) Prior Publication Data

US 2016/0280409 A1 Sep. 29, 2016

Related U.S. Application Data

(60) Provisional application No. 62/137,993, filed on Mar. 25, 2015.

(51) Int. Cl.
*B65B 61/18* (2006.01)
*B65D 33/00* (2006.01)
(Continued)

(52) U.S. Cl.
CPC ........ *B65B 61/188* (2013.01); *B65B 67/1238* (2013.01); *B65D 33/007* (2013.01);
(Continued)

(58) Field of Classification Search
CPC ....... B31B 50/814; B31B 50/84; B31B 50/85; B31B 70/81; B31B 70/813; B31B 70/8132; B31B 70/8133; B31B 70/8136; B31B 70/84; B31B 70/85; B31B 70/853; B31B 70/855
(Continued)

(56) References Cited

U.S. PATENT DOCUMENTS 3,025,813 A   3/1962   Klausmann et al.
3,381,645 A   5/1968   Klausmann et al.
(Continued)

FOREIGN PATENT DOCUMENTS

WO   0067604   11/2000

OTHER PUBLICATIONS

International Search Report, International Application No. PCT/US2016/024291, dated Jun. 14, 2016.

*Primary Examiner* — Andrew M Tecco
*Assistant Examiner* — Praachi M Pathak
(74) *Attorney, Agent, or Firm* — Perman & Green, LLP

(57) ABSTRACT

A fitment mounting apparatus for mounting a hold open fitment to flexible packaging, wherein the hold open fitment has a flexible configuration variable between a first undistended shape and a second stably distended shape, including a frame forming a holder configured for holding more than one of the hold open fitments within the holder, a flexible packaging positioning system arranged for positioning flexible packaging for mounting the hold open fitment to the flexible packaging, and an applicator coupled to the frame configured to engage at least one edge of the hold open fitment in the holder and bias the at least one edge so that the hold open fitment is singulated, from others of the more than one hold open fitments in the holder, and issued from the holder into the flexible packaging on the flexible packaging positioning system substantially simultaneous with singulation.

27 Claims, 19 Drawing Sheets

(51) Int. Cl.

| | | |
|---|---|---|
| *B65B 67/12* | (2006.01) | |
| *B29L 31/00* | (2006.01) | |
| *B29C 65/08* | (2006.01) | |
| *B29C 65/78* | (2006.01) | |
| *B29C 65/00* | (2006.01) | |
| *B29C 65/02* | (2006.01) | |
| *B31B 160/10* | (2017.01) | |
| *B31B 70/60* | (2017.01) | |
| *B31B 155/00* | (2017.01) | |
| *B31B 70/81* | (2017.01) | |

(52) U.S. Cl.
 CPC .............. *B29C 65/02* (2013.01); *B29C 65/08* (2013.01); *B29C 65/7847* (2013.01); *B29C 66/1122* (2013.01); *B29C 66/472* (2013.01); *B29C 66/474* (2013.01); *B29C 66/5344* (2013.01); *B29C 66/612* (2013.01); *B29L 2031/7128* (2013.01); *B31B 70/60* (2017.08); *B31B 70/813* (2017.08); *B31B 70/8131* (2017.08); *B31B 70/8134* (2017.08); *B31B 2155/00* (2017.08); *B31B 2160/10* (2017.08)

(58) Field of Classification Search
 USPC .................................. 493/213, 214, 87, 103
 See application file for complete search history.

(56) References Cited

U.S. PATENT DOCUMENTS

| | | | | |
|---|---|---|---|---|
| 3,769,819 | A * | 11/1973 | Contreras | D06F 95/006 68/213 |
| 4,254,601 | A * | 3/1981 | Prager | B29C 65/18 156/510 |
| 4,695,337 | A * | 9/1987 | Christine | B29C 65/18 156/253 |
| 4,878,987 | A * | 11/1989 | Ven Erden | B65B 61/188 156/519 |
| 4,892,414 | A * | 1/1990 | Ausnit | B65D 33/2516 383/5 |
| 4,986,859 | A * | 1/1991 | Watanabe | B29C 65/18 156/274.4 |
| 5,007,142 | A * | 4/1991 | Herrington | B65D 33/2591 24/399 |
| 5,782,733 | A * | 7/1998 | Yeager | B65B 61/188 493/213 |
| 6,345,911 | B1 | 2/2002 | Young et al. | |
| 6,427,421 | B1 | 8/2002 | Belmont et al. | |
| 6,574,939 | B1 * | 6/2003 | Heijnen | B65B 9/20 156/66 |
| 7,197,893 | B2 * | 4/2007 | Trinh | A61F 7/103 62/457.2 |
| 7,223,017 | B2 | 5/2007 | Weaver | |
| 7,326,217 | B2 | 2/2008 | Leighton | |
| 7,341,085 | B2 * | 3/2008 | Tinivella | B65B 61/00 156/252 |
| 7,871,481 | B2 * | 1/2011 | Kasai | B65D 33/2591 156/73.1 |
| 2006/0252625 | A1 * | 11/2006 | Owen | B65B 61/188 493/394 |
| 2007/0283664 | A1 * | 12/2007 | Leighton | B65B 9/20 53/133.4 |
| 2010/0105535 | A1 * | 4/2010 | Moulin | A44B 19/62 493/213 |
| 2013/0248541 | A1 | 9/2013 | Verma | |
| 2013/0301957 | A1 | 11/2013 | Pellingra et al. | |

\* cited by examiner

APPLICATOR SYSTEMS FOR MOUNTING STRIP-LIKE FITMENTS TO FLEXIBLE PACKAGING

CROSS-REFERENCE TO RELATED APPLICATION

This application is a non-provisional of U.S. Provisional Patent Application Ser. No. 62/137,993, filed Mar. 25, 2015, the disclosure of which is hereby incorporated by reference in its entirety.

BACKGROUND

1. Field

The exemplary embodiments generally relate to fitment applicators, more particularly, mounting strip fitments to flexible packaging.

2. Brief Description of Related Developments

Conventional flexible packages exist that may include a re-sealable adhesive seal, a re-closable zipper, or any other fitment strip to aid in opening and closing the flexible packages or maintaining the flexible packages in a desired configuration. These conventional flexible packages are generally used to enclose and/or hold a wide variety of items, articles or products in solid, semi-solid or liquid form. One or more items, articles or products can be manufactured or assembled and then be packaged in these flexible packages. The conventional flexible packages and the enclosed items, articles or products can then be shipped to wholesalers, distributors and retailers for sale to the general public. Consumers can then purchase the items, articles or products packaged in these conventional flexible packages at grocery stores, mass merchandise stores, home improvement stores, garden supply stores, and feed stores. Consumers prefer an easier way to open and close these conventional flexible packages, which therefore, is attributable to the popularity of these conventional packages. Product manufactures, however, have struggled to find a simple and easy way to mount the fitments to the package, while assembling these packages, such that they can be manufactured fast and easy, and produced in mass quantity (see for example, U.S. Pat. No. 7,329,217 as an example of a conventional method of applying fitments to flexible packaging).

It would be advantageous to have a method and apparatus which is designed to quickly and easily apply strip fitments to flexible packaging.

BRIEF DESCRIPTION OF THE DRAWINGS

The foregoing aspects and other features of the disclosed embodiment are explained in the following description, taken in connection with the accompanying drawings, wherein:

FIG. 2A is a schematic illustration of a portion of a fitment applicator according to one or more aspects of the present disclosure.

FIG. 4A is a schematic illustration of a portion of a fitment applicator according to one or more aspects of the present disclosure.

FIG. 9A is a schematic illustration of a portion of a fitment applicator according to one or more aspects of the present disclosure.

DETAILED DESCRIPTION

Figure 20:
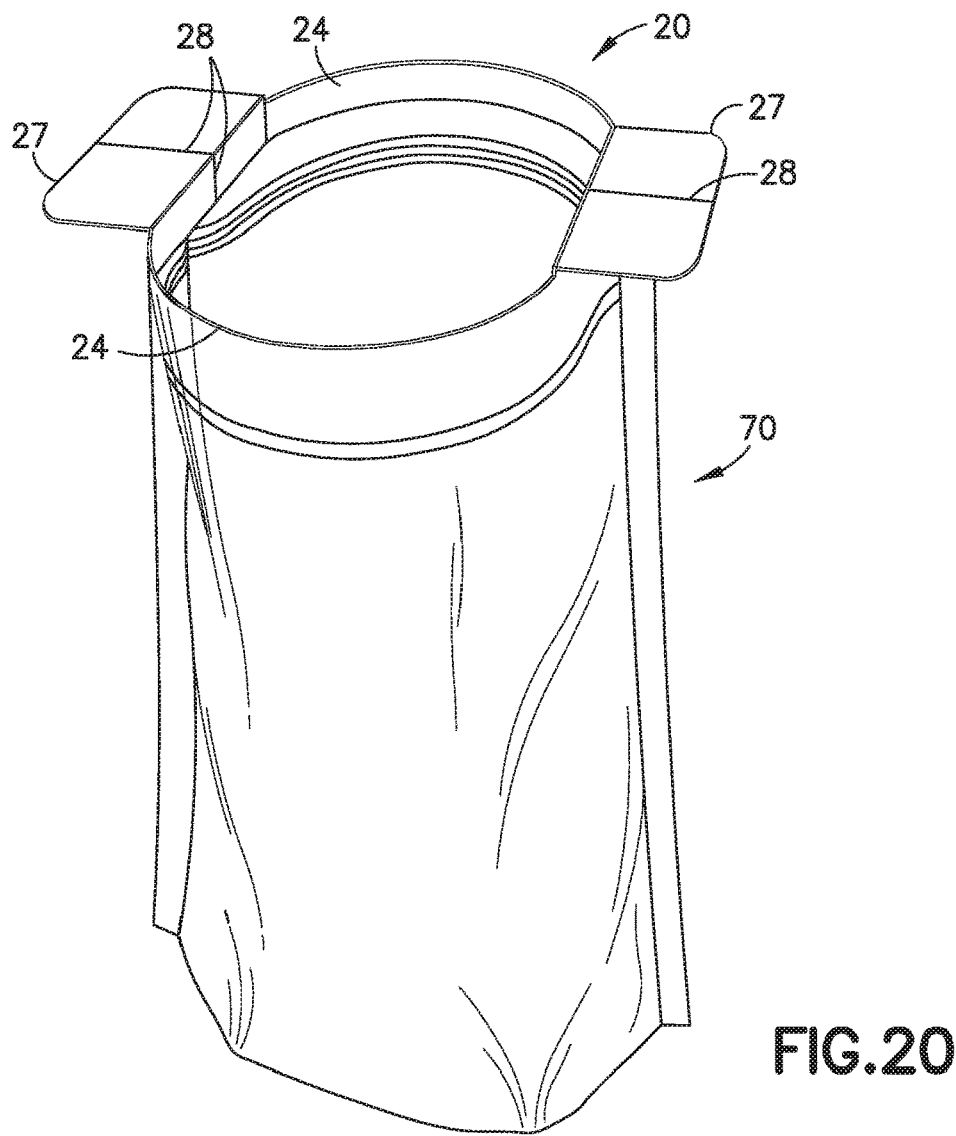
FIGS. 20 and 20A are schematic illustrations of a strip fitment and flexible packaging according to one or more aspects of the present disclosure.
Figure 20A:
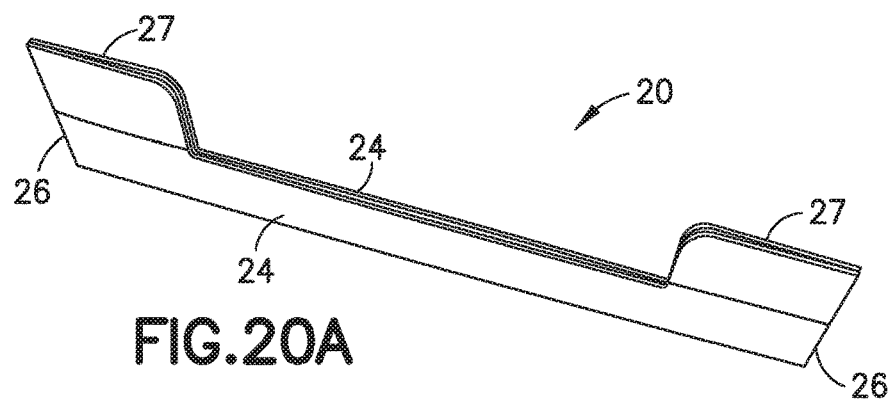

Referring to FIGS. 20 and 20A, in one aspect, a representative strip fitment, according to aspects of the disclosed embodiment, may be a hold-open device, for example, similar to that described in U.S. patent application Ser. No. 14/259,868, filed Apr. 23, 2014, the disclosure of which is hereby incorporated by reference in its entirety. The hold-open device 20, illustrated in FIGS. 20-20A, is a representative example, and generally includes a peripheral strip provided by two side portions 24 coupled together at their ends 26 by two hinge portions 28. In other aspects, the hold open fitment, or strip fitment may have any suitable configuration. The side portions 24 can be of suitable proportions, as illustrated, connected by hinge portions 28 that are positioned, for example, at two opposing ends of the device 20. As may be realized, the strip portions may be of a flexible material, and in combination with hinges 28, provide the fitment a variable configuration between stable shapes such as a stable closed or un-distended shape and an open or stable distended shape. The hinge portions 28 are configured to allow the two side portions 24 to lie directly against one another along their entire length to define the closed configuration. The hinge portions 28 also allow the two side portions 24 to be separated, with each of the side portions 24 assuming (i.e., flexing into) a generally arcuate shape. As seen in FIGS. 20-20A, the fitment includes one or more movable or foldable portions 27, for example, dependent from or otherwise connected to the side portions 24. The movable portions 27 may be connected by hinges, allowing relatively free movement of the portions to stably support the hold open fitment in a stable shape, such as the stable distended, or hold open shape of the fitment as shown in FIG. 20.

In some constructions, the construction includes integrally molding as a ring from a flexible thermoplastic polymer material. In other constructions, the peripheral strip may be formed by bonding together (e.g., via a heat seal, solvent weld, etc.) two opposing ends of a finite length or strip of material cut from a continuous tape feed.

For exemplary purposes, the hold open fitments 20 are produced as a homogenous injection molded part. The hold open fitment 20 is molded flat in a strip like configuration. The hold open fitment 20 may comprise a core and a symmetric cavity and sliding core. The sliding core allows for a gap between the hinge portions 28. A snap hold open fitment, which is produced in a similar fashion to the hold open fitment 20, additionally has bonding points proximate the snap flexure. The bonding is performed via heat spot seal or ultrasonic welding. Alternatively, the bonding points can be included in the injection mold where a sliding core will create clearance between the flexible and opposing member surface. In other aspect, the strip fitments may have any suitable configuration, such as a slider strip fitment.

In one aspect, the hold-open device 20 is applied to flexible packaging 70 (e.g., a preformed flexible packaging) as part of an assembly process or as a tape where the mechanisms are applied in conjunction with horizontal form fill seal (HFFS) or vertical form fill seal (VFFS) machinery used to form, fill and seal flexible packaging 70. Other suitable examples of a strip fitment can be found in U.S. application Ser. No. 13/786,068, filed Mar. 5, 2013, U.S. Pat. No. 6,345,911, filed Jun. 6, 2000, U.S. Pat. No. 7,223,017, filed Dec. 19, 2003, and U.S. Pat. No. 6,427,421, filed Jul. 28, 2000, the disclosure of which are incorporated by reference in their entirety.

Still referring to FIG. 20, according to aspects of the disclosed embodiment, preformed flexible packaging 70 described herein, may be substantially similar to that described in U.S. patent application Ser. No. 13/801,205, filed Mar. 13, 2013, the disclosure of which is hereby incorporated by reference in its entirety. The flexible packaging 70 may include films of polyester, nylon, polypropylene, high density polyethylene, low density polyethylene, linear low density polyethylene, copolymers of ethylene, propylene or butene-1 and terpolymers of ethylene, propylene or butene-1, and polystyrene and other similar film materials. The flexible packaging 70 may be formed from, for instance, a monolayer film, a coextruded film, or a multilayer laminated film or a film in film type construction (i.e. structural film on outside and barrier film on inside) or any other suitable thin film material. A monolayer film may be formed from, for instance, a blown film or a cast film comprising of polypropylene, polyethylene, nylon, or any other suitable materials for use in a film. In alternate aspects, a monolayer film may be formed from any suitable material by any suitable means. The monolayer film may also have additives included for improved processing or physical characteristics of the resultant monolayer film. For example, monolayer films may also be formed with additives which modify transparency, feel, print quality, or barrier properties of the film, or any other suitable film characteristics which may be desirable. In other aspects, the flexible packaging may have any suitable configuration.

The preformed flexible packaging 70 may also be formed from a coextruded film. A coextruded film may be formed from blown film or a cast film and may further use combinations of resin types which are coextruded to form multiple layers. The film materials used to form a coextruded film may include polyester, polypropylene, polyethylene, nylon, or ethylene vinyl alcohol, or any other suitable film material. The film materials may be combined in multiple layers in any suitable configuration for desirable characteristics of the resultant coextruded film. A coextruded film may have any suitable number of layers. The preformed flexible packaging 70 may also be formed from a laminated film. Laminated films may be comprised of a combination of co-extruded and/or monolayer films similar to those discussed previously. A laminated film may be laminated by any suitable lamination technology, including, but not limited to, extrusion, thermal bonding, and solvent or solventless lamination technologies. In alternate aspects, any suitable means of lamination of films may be used. The lamination configuration may be adjustable so that the resultant film may have desirable characteristics, for instance barrier properties, coefficient of friction, print layer characteristics, varnish, texture, and any other suitable characteristics desirable in a resultant film.

Figure 1:
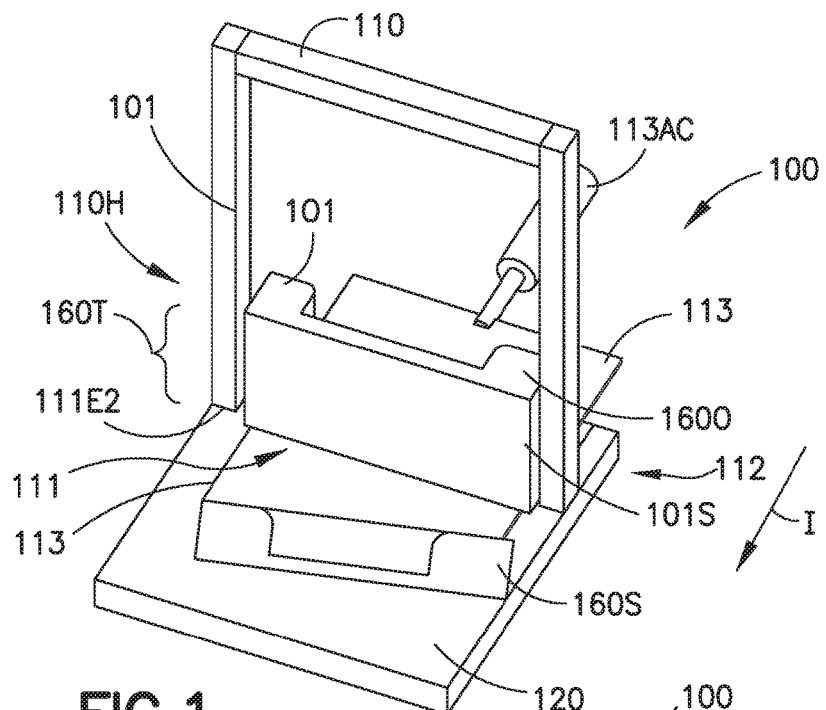
FIGS. 1 and 2 are schematic illustrations of a fitment applicator according to one or more aspects of the present disclosure.
Figure 2:
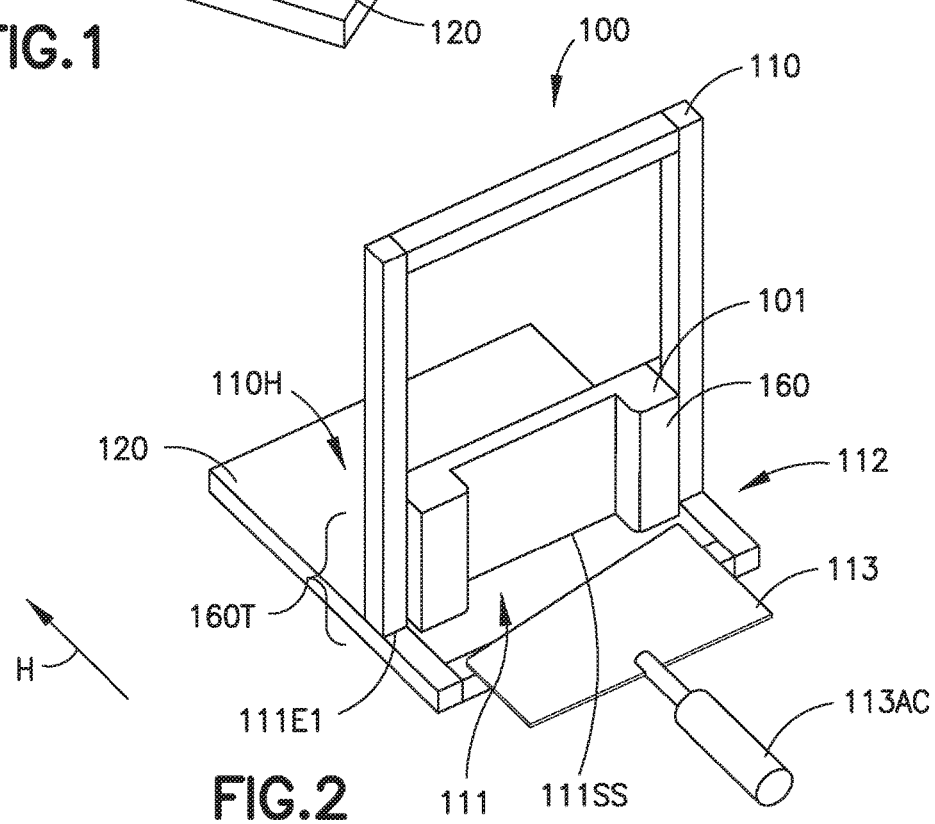

FIG. 1 illustrates a fitment applicator 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

Referring to FIGS. 1-3 and 20-20A, the aspects of the present disclosure described herein provide for a fitment applicator 100 configured to insert and secure strip fitments 160, such as described above, into flexible packaging 150, such as described above, otherwise generally referred to as a container. In one aspect, strip fitments 160 are hold open fitments, though in other aspects are any suitable strip fitment, such as linear closure fitments similar to the fitment shown and described in U.S. Pat. No. 6,345,911, previously incorporated herein by reference. The fitment applicator 100, also generally referred to as a mounting system, is configured for stripping/singulating the strip fitments 160 from a stack 160T of strip fitments 160, also generally referred to as hold open fitments, and inserting the stripped strip fitment 160S into the flexible packaging 150. The fitment applicator 100 generally includes a frame 110 forming, for example, a hopper 110H or fitment holder. The frame 110 being configured to hold the strip fitments 160 within the hopper 110H so that the strip fitments 160 may be inserted into the flexible packaging 150 as described herein. The frame 110 includes an outlet 111, also referred to as a fitment dispenser, having a channel 111X, including an entrance aperture 111E1, an exit aperture 111E2, and a stop surface 111SS (see FIG. 2A), that is defined by at least one aperture in the frame 110 through which the strip fitments 160 pass in order to be dispensed from the frame 110. In one aspect, the entrance aperture 111E1 and exit aperture 111E2 are aligned substantially opposite each other. In other aspects, the entrance aperture 111E1 and exit aperture 111E2 are aligned in any orientation to effect dispensing of the strip fitment 160. The exit aperture 111E2 has an opening height slightly larger than a height of the strip fitments 160, so that only a single stripped strip fitment 160S can pass through the exit aperture 111E2 at a time. The entrance aperture 111E1 and exit aperture 111E2 of channel 111X are sized to allow an engagement member 113, also referred to as an actuated member, to pass through the hopper 110H of frame 110 to engage a strip fitment 160 and push the strip fitment 160 out of the exit aperture 111E2 for positioning the strip fitment 160 within the flexible packaging 150. The outlet 111 is oriented such that the strip fitment 160 pushed out of the exit aperture 111E2, is dispensed in direction I effecting insertion of the strip fitment 160 into the flexible packaging 150. The engagement member 113, which may be, for example, a slide plate or a blade, is communicatively coupled or attached to the frame 110, for example, at the entrance aperture 111E1, and cooperates with the outlet 111 to push strip fitments through the outlet 111 and into the flexible packaging 150. Together, the engagement member 113 and outlet 111 form a stripper 112 also referred to as an applicator. The stripper 112 is made operable by positioning or orienting the engagement member 113 such that the engagement member 113, from a first retracted position, enters the entrance aperture 111E1 of the outlet 111 and interfaces with a single strip fitment 160S, also referred to as the stripped strip fitment, held in the frame 110 with other stored strip fitments 1600 (e.g., that form the stack 160T of strip fitments 160). The engagement member 113 engages the flexible strip fitment 160 in the stable closed or un-distended shape, such that the flexible strip fitment 160 lays substantially flat with both side portions 24 against one another along their entire length. The engagement member, along with the un-distended strip fitment 160S, extends to a second extended position, through the exit aperture 111E2 of the outlet 111 to singulate the strip fitment 160S, individually, from the other stored strip fitments 1600 held in the frame 110 and dispenses the stripped strip fitment 160S from the frame for insertion into the flexible packaging 150 generally proximate an opening or "top" of the flexible packaging 150 before returning to the first retracted position. In one aspect, the stripper 112 singulates the strip fitment 160 and simultaneously at least partially inserts the strip fitment into the flexible packaging 150. In other aspects, the strip fitment 160 may be inserted in any suitable manner. The engagement member 113 is coupled to any suitable linear actuator 113AC configured to provide a reciprocation movement of the engagement member 113 so that the engagement member 113 passes through the outlet 111 and then retracts to strip another strip fitment 160 from the stack 160T. The engagement member 113 is generally slightly thinner than the thickness of the strip fitments 160 and has a width slightly less than the width of the strip fitments 160.

In one aspect, the frame 110 includes a preloading mechanism 101 to supply a substantially constant load to the strip fitments 160 so that the stack 160T of strip fitments 160 is biased towards the channel 111X of the hopper 110H. The substantially constant load, from the preloading mechanism, along with fitment seat 101S, are provided in order to ensure the strip fitments 160 remain in a substantially flat, closed or un-distended shape, substantially in a stacked orientation. Additionally, preloading mechanism 101 and fitment seat 101S maintain the strip fitments 160, to be stripped, in a position relative to the outlet 111, such that the stack 160T of strip fitments 160 are seated against the fitment seat 101S along an edge 160E2 (see FIG. 10) of the strip fitment 160 while the lowest strip fitment 160 is seated against the stop surface 111SS and is operable to be engaged by the engagement member 113 in a manner substantially similar to that described above. The stop surface 111SS and the fitment seat 101S form the exit aperture 111E1 therebetween, such that a single strip fitment 160 may be dispensed between the fitment seat 101S and stop surface 111SS while being biased by the engagement member on another edge 160E1 (see FIG. 10) of the strip fitment 160. In other aspects, any strip fitment 160 from the stack 160T of strip fitments 160 is operable to be stripped from the stack 160T of strip fitments 160. In one aspect, the preloading mechanism 101 is a gas spring. In other aspects, the preloading mechanism 101 is a weight mechanism, effected by gravity, a spring, or any other alternative biasing member that provides a substantially constant load. The fitment applicator generally operates such that the strip fitment 160 is stripped from the stack 160T of strip fitments 160 and substantially simultaneously inserted into the flexible packaging 150. The fitment applicator 100 also includes a flexible packaging positioning system 120, otherwise generally referred to as a support or a transport system, communicatively coupled to or formed at least in part by the frame 110 of the fitment applicator 100 to support and position the flexible packaging 150. In one aspect, the flexible packaging positioning system 120 is a flatbed or table for loading and/or positioning the flexible packaging 150 relative to the frame 110 (e.g. relative to the outlet 111) so that the strip fitments 160 can be inserted into the flexible packaging 150. The positioning and/or loading of the flexible packaging 150 may be manual or automated as described herein. In one aspect, the flexible packaging positioning system 120 includes one or more datum feature, also referred to as reference members, for locating the flexible packaging 150 relative to the frame 110 as described herein.

Figure 3:
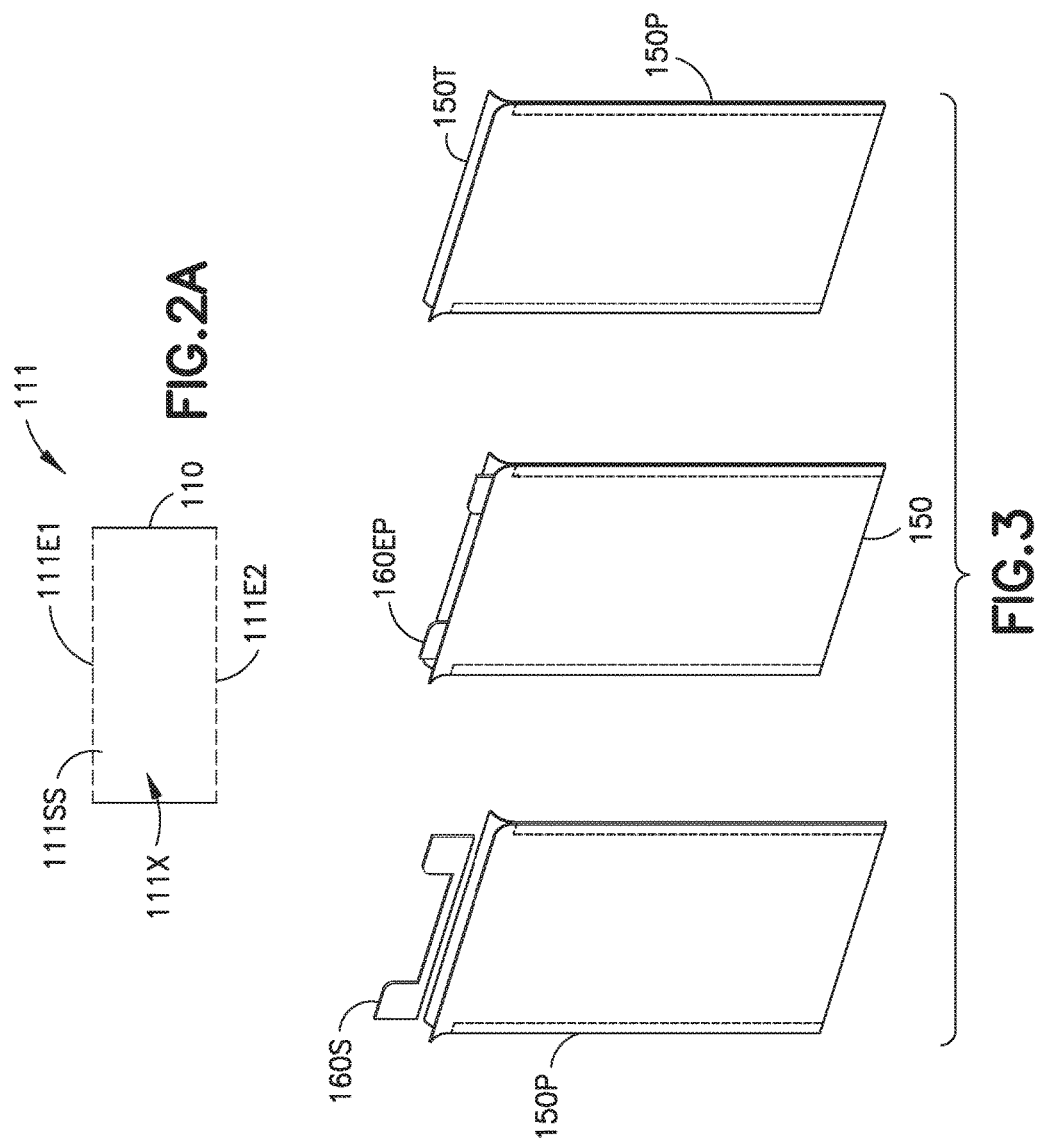
FIG. 3 is a schematic illustration of flexible packaging according to one or more aspects of the present disclosure.
Figure 4:
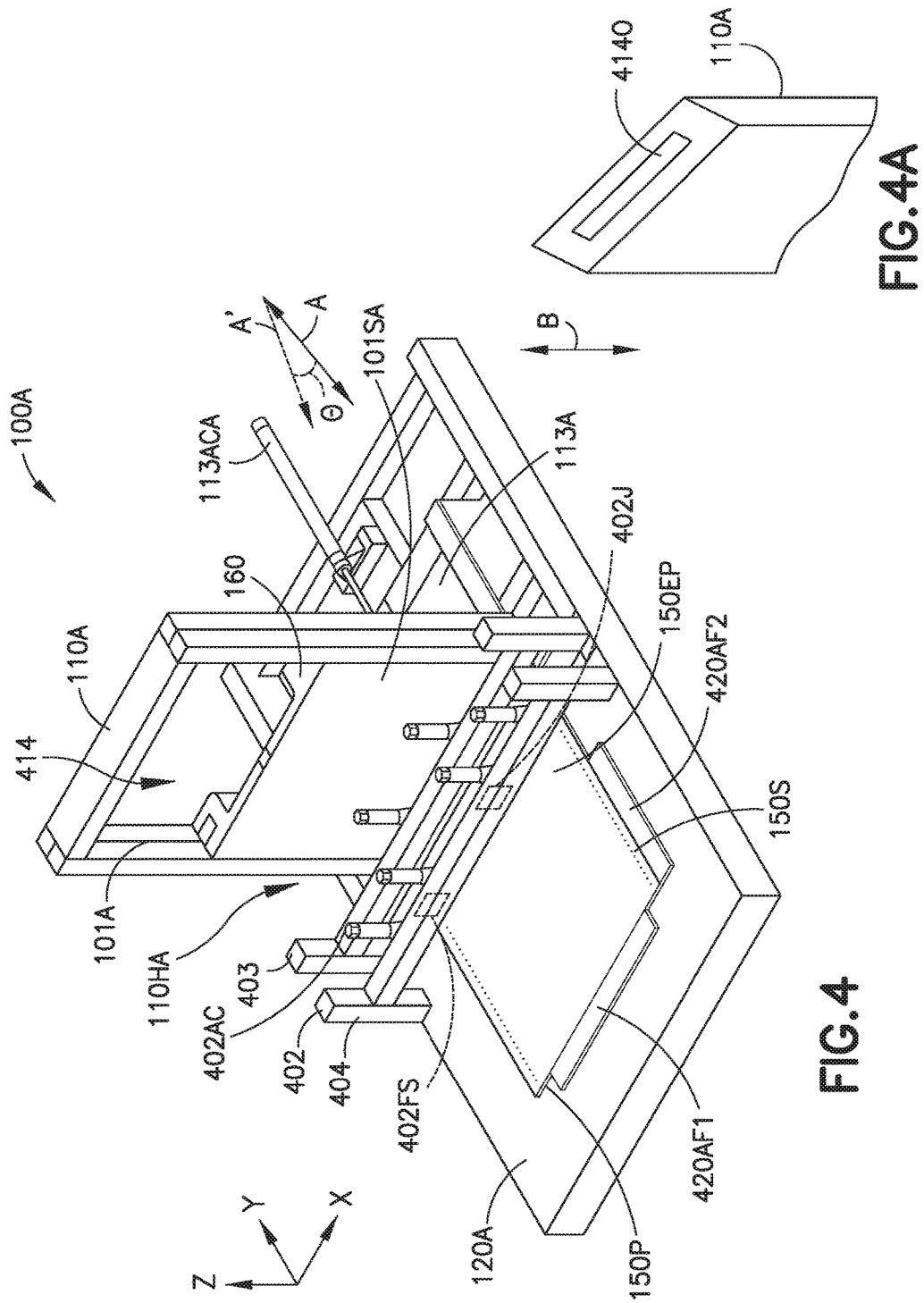
FIGS. 4 and 5 are schematic illustrations of a fitment applicator according to one or more aspects of the present disclosure.

Referring now to FIGS. 3-6 and 20-20A, a semi-automatic fitment applicator 100A substantially similar to fitment applicator 100 is shown. In one aspect, the semi-automatic fitment applicator 100A includes a frame 110A forming a hopper 110HA. In other aspects, the frame 110A defines a cavity, a chamber, or a channel. The frame 110A is configured to hold strip fitments 160 to be mounted in preformed flexible packaging 150P, generally in the top portion 150T or any opening of the preformed flexible packaging 150P, including for example a side portion or bottom portion. In one aspect, the frame 110A has a substantially vertical orientation, as shown in FIG. 4 wherein, for exemplary purposes only, the vertical axis is defined by the z axis and the horizontal axis/plane is defined by the x and y axes, such that the strip fitments 160 are stacked within the frame 110A in a similar substantially vertical orientation. In another aspect, frame 110A has a substantially horizontal orientation, relative to the X, Y, Z axes, such that the strip fitments 160 are stacked within the frame 110A in a similar substantially horizontal orientation. In other aspects, any spatial identifiers, other than vertical and horizontal, may be used to identify a spatial position of the frame 110A or any other portion of the applicators described herein. In yet another aspect, frame 110A may be arranged to stack 160T the strip fitments 160 and insert the strip fitments 160 into the flexible packaging 150 in any other suitable alternative orientation. In one aspect, the frame 110A is adjustable to provide a sized or shaped cavity (e.g. hopper 110HA) for any sized or shaped strip fitments 160 to be stacked within the frame 110A. In one aspect, the frame 110A includes a preloading mechanism 101A, such as that described above, to supply a substantially constant load to the strip fitments 160 so that the stack 160T of strip fitments 160 seated against the fitment seat 101SA along an edge 160E2 (see FIG. 10) of the strip fitment 160 is biased towards stop surface 111SSA (substantially similar to stop surface 111SS) of channel 111XA, similar to channel 111X, of the hopper 110HA. The substantially constant load is provided in order to ensure the strip fitments 160 remain in a substantially flat, closed or un-distended shape, substantially in a stacked orientation. Additionally, preloading mechanism 101A and fitment seat 101SA maintain strip fitment 160, to be stripped, in a position relative to the outlet 111A, such that the stack 160T of strip fitments 160 are seated against the fitment seat 101S along an edge 160E2 (see FIG. 10) of the strip fitment 160 while the lowest strip fitment 160 is seated against the stop surface 111SS and is operable to be engaged by an engagement member 113A, in a manner substantially similar to that described above. In one aspect, the preloading mechanism 101A is a gas spring. In other aspects, the preloading mechanism 101A is a weight mechanism, effected by gravity, a spring, or any other alternative biasing member that provides a substantially constant load.

In one aspect, in a manner substantially similar to that described above, the frame 110A has an inlet 414 to receive strip fitments 160 and an outlet 111A, where the outlet 111A (substantially similar to outlet 111 described above) includes the channel 111XA, to dispense strip fitments 160. In one aspect, the inlet 414 defines an aperture within the frame 110A for inserting strip fitments 160 into the hopper 110HA of the frame 110A. In one aspect, the strip fitments 160 are generally inserted in the substantially flat, un-distended shape, such that the strip fitments 160 may be stacked one on top of the other and positioned to allow the engagement member 113A to interface with the strip fitments 160. In other aspects, the inlet 414 defines a door, ingress, or entrance 414O opened to gain access to the hopper 110H for strip fitments 160 to be placed inside. (as seen in FIG. 4A) In yet another aspect, the strip fitments 160 arrive in a cartridge which is inserted into the frame 110A. In one aspect, the outlet 111A defines an aperture within the frame 110A. In one aspect, the outlet 111A is slightly larger than the strip fitments 160 such that only a single stripped strip fitment 160S is able to pass through at a time. In yet other aspects, the outlet 111A is reconfigurable for dispensing strip fitments 160 of different shapes and sizes.

Figure 5:
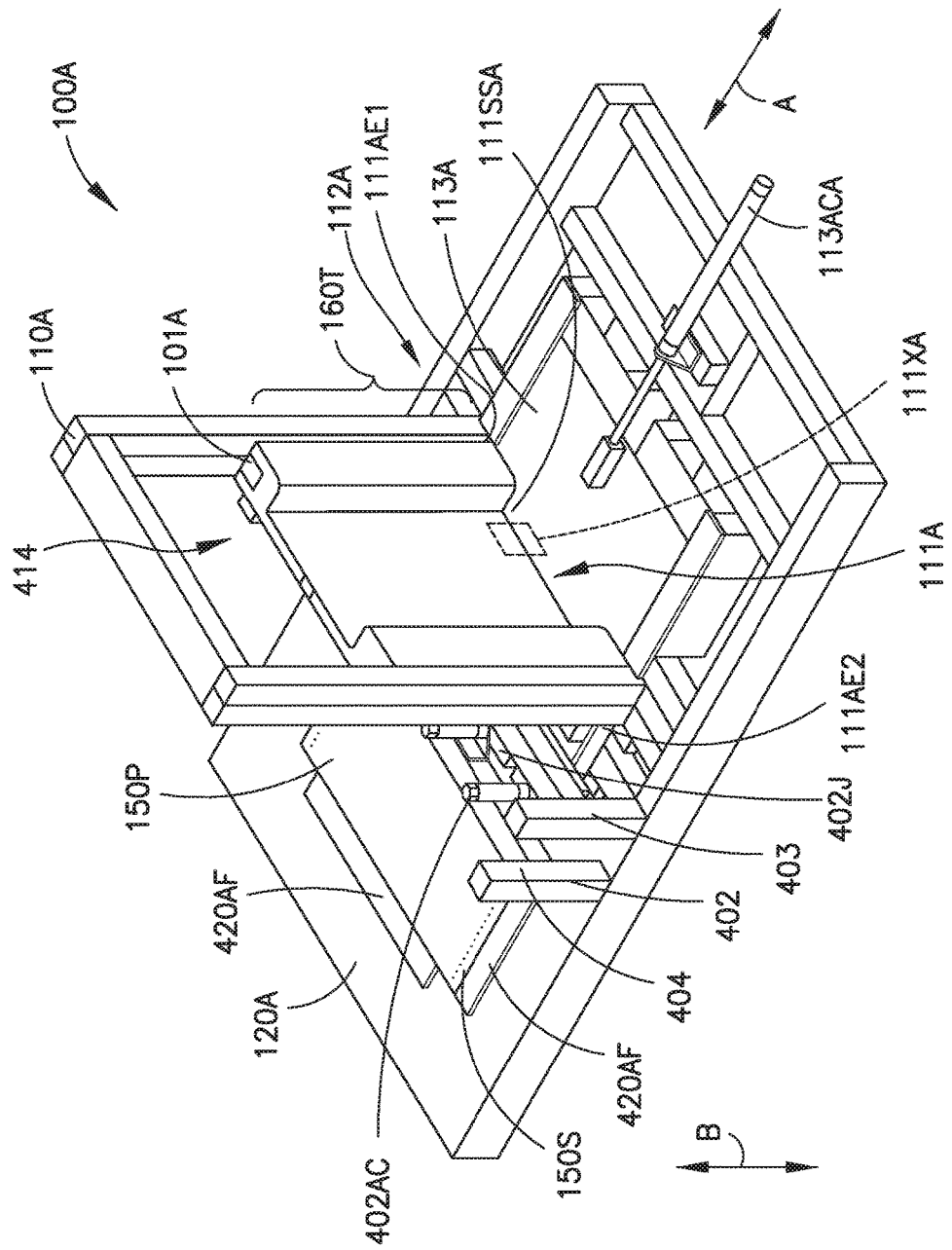

The semi-automatic fitment applicator 100A has engagement member 113A attached to the frame 110A where, as above, the engagement member 113A forms a stripper 112A with the outlet 111A. The engagement member 113A being configured for stripping each strip fitment 160 stored in the frame 110A one by one. In one aspect, the stripper 112A singulates the strip fitment 160 and simultaneously at least partially inserts the strip fitment into the flexible packaging 150, substantially similar to stripper 112 described above. In order to effect stripping, the engagement member 113A is positioned relative to an entrance aperture 111AE1 of channel 111XA and oriented such that when actuated by an actuator 113ACA (similar to actuator 113AC above, the engagement member 113A is extended in direction A to engage the flexible strip fitment 160 in the stable closed or un-distended shape, and dispense or extract a strip fitment 160 from the hopper 110HA out of the exit aperture 111AE2 of channel 111XA of the outlet 111A. The actuator 113ACA is generally a power actuator including a power source and a linearly actuated member. In one aspect, the actuator 113ACA is a pneumatic actuator. In other aspects, the actuator can be any one of, for example, an electric, hydraulic, or mechanical actuator, or any other suitable actuator. In one aspect, the engagement member 113A has a contact surface 113CS (seen best in FIG. 10) for engaging edge 160E1 (shown in FIG. 10) of the strip fitments 160. The contact surface of the engagement member and engagement of the strip fitment are representative of each similar interface between the engagement member and strip fitment in all aspects described herein. In one aspect, the contact surface 113CS is oriented relative to the flexible packaging 150 such that the strip fitments 160 are dispensed substantially parallel to the top portion 150T of flexible packaging 150. In other aspects, contact surface 113CS is angled relative to the flexible packaging 150, such that the strip fitments 160 are dispensed at an angle $\alpha$ relative to the top portion 150T of flexible packaging 150. The angle $\alpha$ may be any suitable angle so that one corner edge 160CE1 (FIG. 10) of strip fitment 160 is inserted into the flexible packaging 150 prior to another corner edge 160CE2 (FIG. 10) where the one corner edge 160CE1 and other corner edge 160CE2 are located on a common side 160E2 of the strip fitment 160 being inserted into the flexible packaging 150. In one aspect, the engagement member 113A is smaller (e.g., has a height and width smaller than a height and width of the strip fitments 160 as described above) than the strip fitments 160 such that interface with the edge 160E1 of the strip fitment 160 is limited to a single strip fitment 160S. In one aspect, an engagement member is actuated, at a skewed angle $\theta$ in a direction A', skewed by angle $\theta$ relative to direction A (for illustrative purposes, FIGS. 4-5 show direction A as being oriented substantially orthogonal to the opening of preformed flexible packaging 150P, and oriented parallel to the sides of preformed flexible packaging 150P, wherein the strip fitments 160 issued in a direction A are orientated at angle $\alpha$ (seen best in FIG. 10). For clarification, in aspects where the actuation of the engagement member is along skewed direction A', dispensing of the strip fitments 160 results in angled orientation of the strip fitment 160 relative to the opening of preformed flexible packaging 150P similar to angle $\alpha$ (shown in FIG. 10)), such that the singulated strip fitment 160 is dispensed out of outlet 111A in a direction of insertion into the preformed flexible packaging 150P along skewed direction A', relative to the opening of the preformed flexible packaging 150P. In other aspects, the outlet 111A may be angled relative to either the engagement member 113A or the support 120A. Additionally, for example, the outlet 111A may be configured to rotate the strip fitment 160 to be aligned with the flexible packaging 150 if the engagement member 113A strips the strip fitments 160 at an angle $\theta$, or the engagement member 113A may be configured to rotate the strip fitment 160 as it is stripped. In other aspects, the opening of the preformed flexible packaging 150P may be skewed in a direction skewed by angle $\theta$ relative to direction A, such that a strip fitment 160 dispensed in direction A is inserted into the opening of preformed flexible packaging 150P at an angle similar to angle $\alpha$ (seen in FIG. 10). In other aspects, the engagement member 113A may have any suitable configuration to make the engagement member 113A operable in stripping the strip fitments 160 one at a time from the stack 160T of strip fitments 160.

The semi-automatic fitment applicator 100A has a support 120A (substantially similar to that described above), otherwise generally referred to as a platform. The support 120A is connected to the frame 110A and configured to hold and position the preformed flexible packaging 150P relative to the frame 110A and exit aperture 111AE2 of the channel 111XA such that a stripped strip fitment 160S is dispensed, in a substantially flat, closed or un-distended, shape, and inserted into the top portion 150T of the positioned preformed flexible packaging 150P. In one aspect, the support 120A may be positioned substantially parallel to the frame 110A, while in other aspects the support is angled or positioned in any suitable configuration for the strip fitment 160 to be dispensed and inserted into the flexible packaging 150. For example, the support 120A may be angled, such that as the strip fitments 160 are dispensed, they are inserted into a preformed flexible packaging positioned at angle α. In one aspect, the support 120A has one or more datum features, such as reference members or alignment features 420AF1, 420AF2 to align the preformed flexible packaging 150P in a position relative to the frame 110A and exit aperture 111AE2 of the channel 111XA. In one aspect, the alignment features 420AF1, 420AF2 protrude from the support 120A so as to engage the sides 150S of preformed flexible packaging 150P. In one aspect, the alignment features 420AF1, 420AF2 are bars while in other aspects, the alignment features 420AF1, 420AF2 are protruding pins or merely lines indicating the predetermined position of the preformed flexible packaging 150P on the support 120A. In FIGS. 4-5, the alignment features 420AF1, 420AF2 are illustrated as two separate features. In other aspects, there may be a single feature for locating the preformed flexible packaging 150P in two dimensions relative to outlet 111A. The features 420AF1, 420AF2 may have any spatial relationship relative to each other so that the features have an arrangement corresponding to a shape of the preformed flexible packaging 150P. In one aspect, the alignment features 420AF1, 420AF2 are adjustable relative to each other and/or the frame 110A, to accommodate different sized or shaped preformed flexible packaging 150P. In other aspects, the alignment features 420AF1, 420AF2 are fixed and unmovable.

In one aspect, the semi-automatic fitment applicator 100 also has a clamp 402 coupled to the frame 110A. The clamp 402 includes at least one movable clamp jaw 402J, movable in direction B, configured for clamping and holding the preformed flexible packaging 150P against the support 120A in a fixed orientation, so that the preformed flexible packaging 150P is prevented from moving while the stripped strip fitment 160S is inserted into the preformed flexible packaging 150P. In one aspect, the clamp 402 is, for example, a bar clamp or vise clamp having parallel jaws. The clamp 402 may also include a fitment stop 402FS, formed e.g. by a side (stop ledge) of the clamp jaw 402J or any other portion of the clamp jaw 402J. The fitment stop 402FS forming a reference feature, generally providing a stop location indicating when the stripped strip fitment 160S is fully inserted to a predetermined depth (e.g. the strip fitment 160 abuts the fitment stop 402FS). In one aspect, the clamp 402 includes any suitable clamp actuator(s) 402AC for moving the clamp jaw 402J and engaging the preformed flexible packaging 150P. For example, in one aspect, the clamp 402 is linearly actuated such that the jaw(s) 402J are actuated between an open position and a closed position. In one aspect, the clamp 402 interfaces with an external portion 150EP of the preformed flexible packaging 150P. In other aspects, the clamp 402 interfaces with an internal portion, side portion, face portion, or any other portion of the performed flexible packaging 150P.

Figure 6:
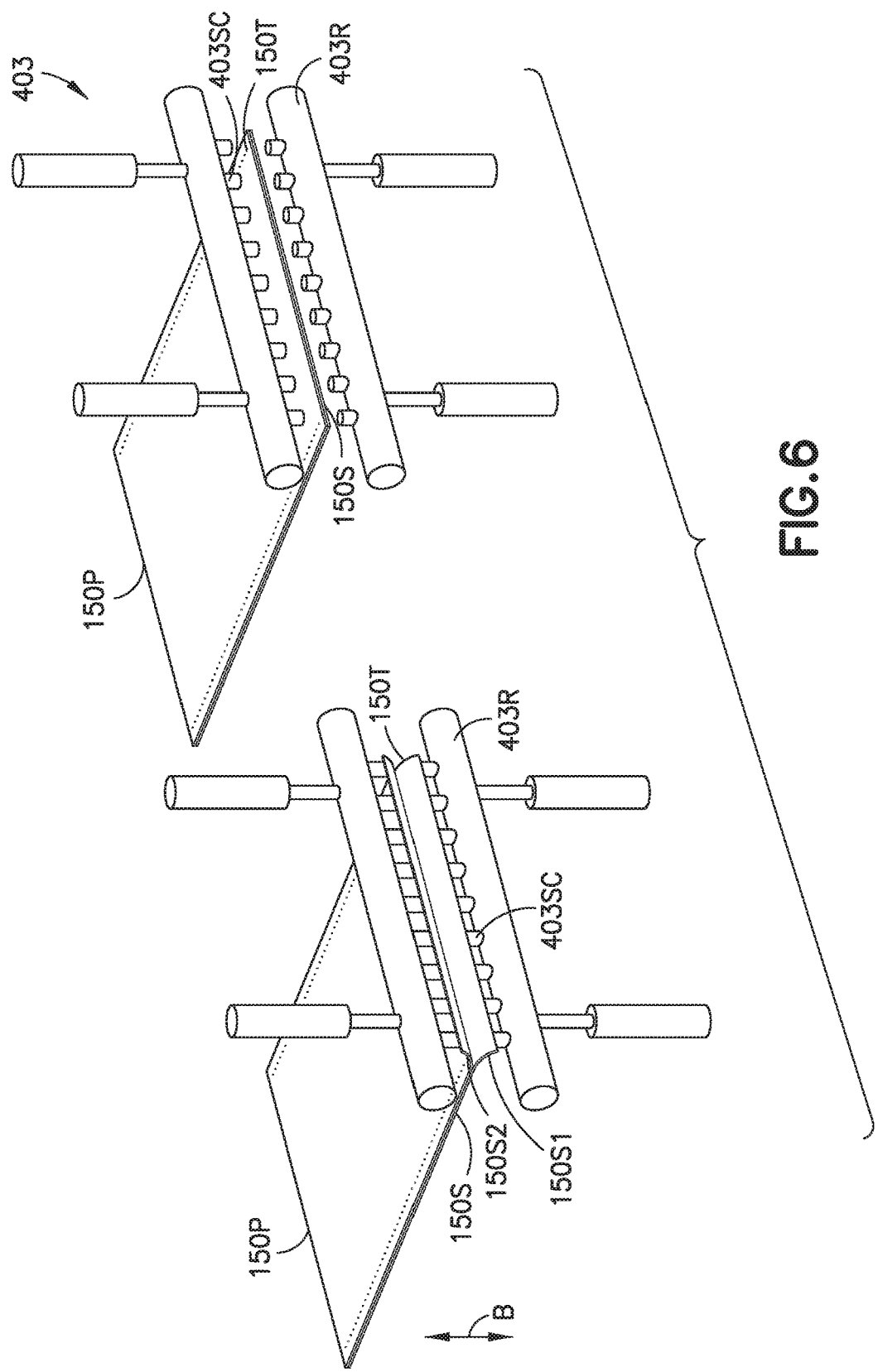
FIG. 6 is a schematic illustration of a portion of a fitment applicator according to one or more aspects of the present disclosure.

In one aspect, the semi-automatic fitment applicator 100 also has a separator 403, for example, shown in FIG. 6. The separator 403 is generally attached to the frame 110A. In one aspect, the separator 403 is configured to interface with and open the preformed flexible packaging 150P. Separation generally occurs at the top portion 150T (or opening) of the preformed flexible packaging 150P for insertion of the stripped strip fitment 160S. However, interface and separation may occur at any portion of the preformed flexible packaging 150P suitable for the strip fitments 160 to be inserted. In one aspect, the separator 403 is, for example, a vacuum jaw having one or more rail(s) 403R on which one or more suction cups 403SC are mounted to span a width of the preformed flexible packaging 150P. In one aspect, the rails 403R may be movable in direction B for engaging the preformed flexible packaging 150P and opening the side of preformed flexible packaging 150P. For example, in one aspect, the preformed flexible packaging 150P includes side seals with a small portion of the one or more side seals toward the opening of the preformed flexible packaging 150P being unsealed (e.g. about ¼ to about ½ inch or any other suitable distance to allow separation of sides). This unsealed portion acting as a separable portion of the preformed flexible packaging 150P along the full opening width of the preformed flexible packaging 150P facilitating the insertion of the strip fitment 160 into the preformed flexible packaging 150P. Accordingly, the separator flares the opened side seals and the full opening width, and the strip fitment 160 of appropriate length, so that fitted to the preformed flexible packaging 150P the strip fitment 160 spans the full length of the opening, is inserted into the opening. In other aspects, such as if one side of the opening, or both sides are closed, a partial width fitment, relative to the full width of the opening is inserted into the preformed flexible packaging 150P in a similar manner to that described. In one aspect, separation may be effected with a wedge entering the flexible packaging and expanding the opening, or an air knife that streams air into the opening of the flexible packaging 150 and expands the opening for insertion of the strip fitment 160

In one aspect, the semi-automatic fitment applicator 100 also includes a sealing mechanism 404. The sealing mechanism 404 generally attached to the frame 110A. In one aspect, the sealing mechanism 404 is configured for sealing, or otherwise affixing, the strip fitments 160 to the preformed flexible packaging 150P. The sealing mechanism 404 may include heat sealing, ultrasonic sealing, or rotary sealing.

Figure 7:
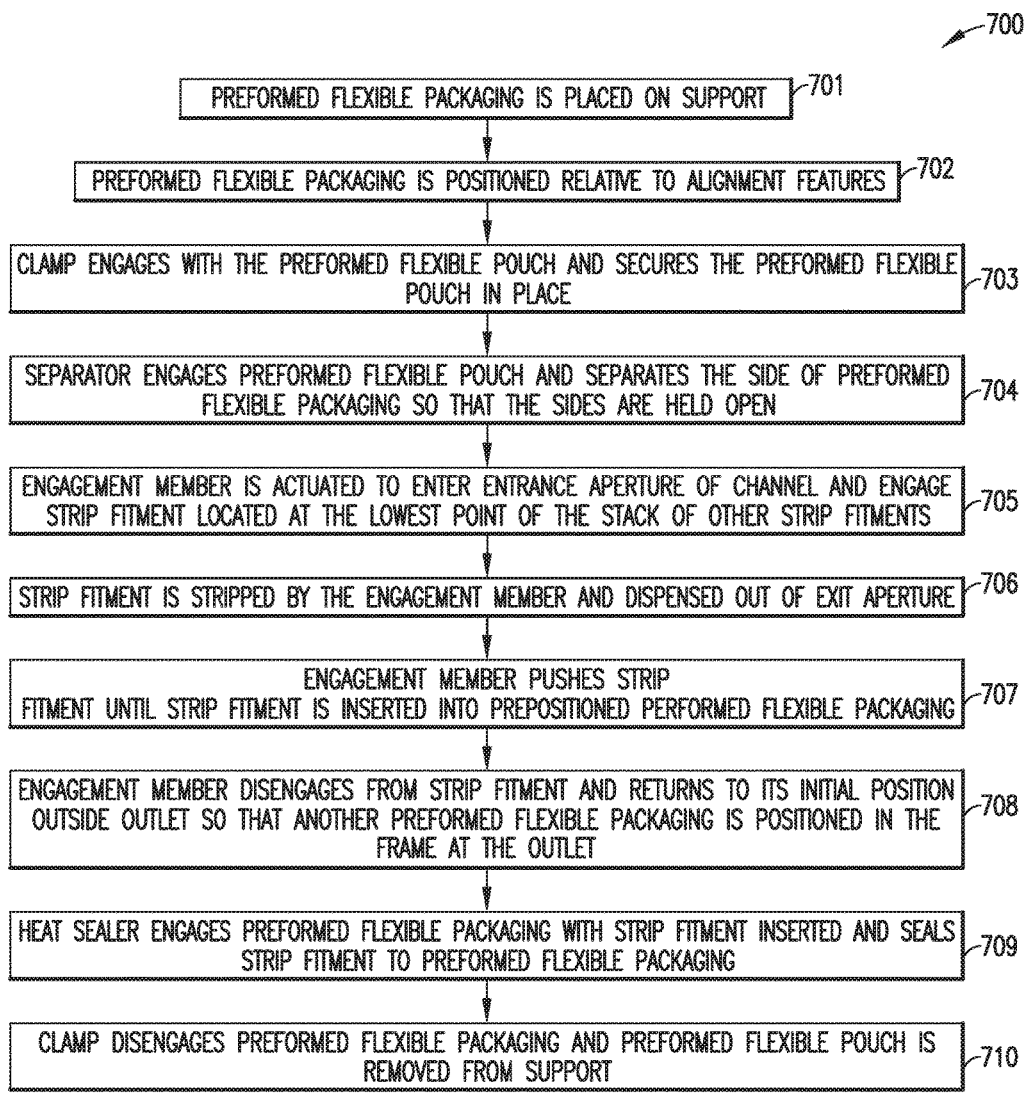
FIG. 7 is a flow chart of a method for mounting strip fitments to flexible packaging with a fitment applicator according to one or more aspects of the present disclosure.

Referring now to FIG. 7, an exemplary flow chart 700 for mounting of strip fitments 160 into flexible packaging 150, using a semi-automatic fitment applicator 100, is shown. Preformed flexible packaging 150P, with open top portion 150T, is placed on support 120A (FIG. 7, Block 701) and positioned relative to frame 110A in any suitable manner such as manually or with automation. Preformed flexible packaging 150P is positioned relative to alignment features 420AF1, 420AF2 (FIG. 7, Block 702). Clamp 402 engages with the preformed flexible pouch 150P and secures the preformed flexible pouch 150P in place (FIG. 7, Block 703). Separator 403 engages preformed flexible pouch 150P and separates the side 150S of preformed flexible packaging 150P at the open top portion 150T so that the sides 150S are held open (FIG. 7, Block 704). Engagement member 113A is actuated to enter entrance aperture 111AE1 of channel 111XA and engage flexible strip fitment 160S in the stable closed or un-distended shape, located at the lowest point of the stack 160T of other strip fitments 1600 (FIG. 7, Block 705). Strip fitment 160S is stripped by the engagement member 113A from the other strip fitments 1600 and dispensed out of exit aperture 111AE2 of the channel 111XA while being simultaneously at least partially inserted into flexible packaging 150P (FIG. 7, Block 706). Engagement member 113A pushes strip fitment 160S, remaining in the stable closed or un-distended shape, until strip fitment 160S is inserted into prepositioned preformed flexible packaging 150P e.g., against the fitment stop (FIG. 7, Block 707). Engagement member 113A disengages from strip fitment 160S and returns to its initial position outside outlet 111A so that another preformed flexible packaging 150P is positioned in the frame 110A at the outlet 111A (FIG. 7, Block 708). Heat sealer 404 engages preformed flexible packaging 150P with strip fitment 160S inserted and seals strip fitment 160S to preformed flexible packaging 150P (FIG. 7, Block 709). Clamp 402 disengages preformed flexible packaging 150P and preformed flexible pouch 150P is removed from support 120A (FIG. 7, Block 710) either manually or with automation.

Figure 8:
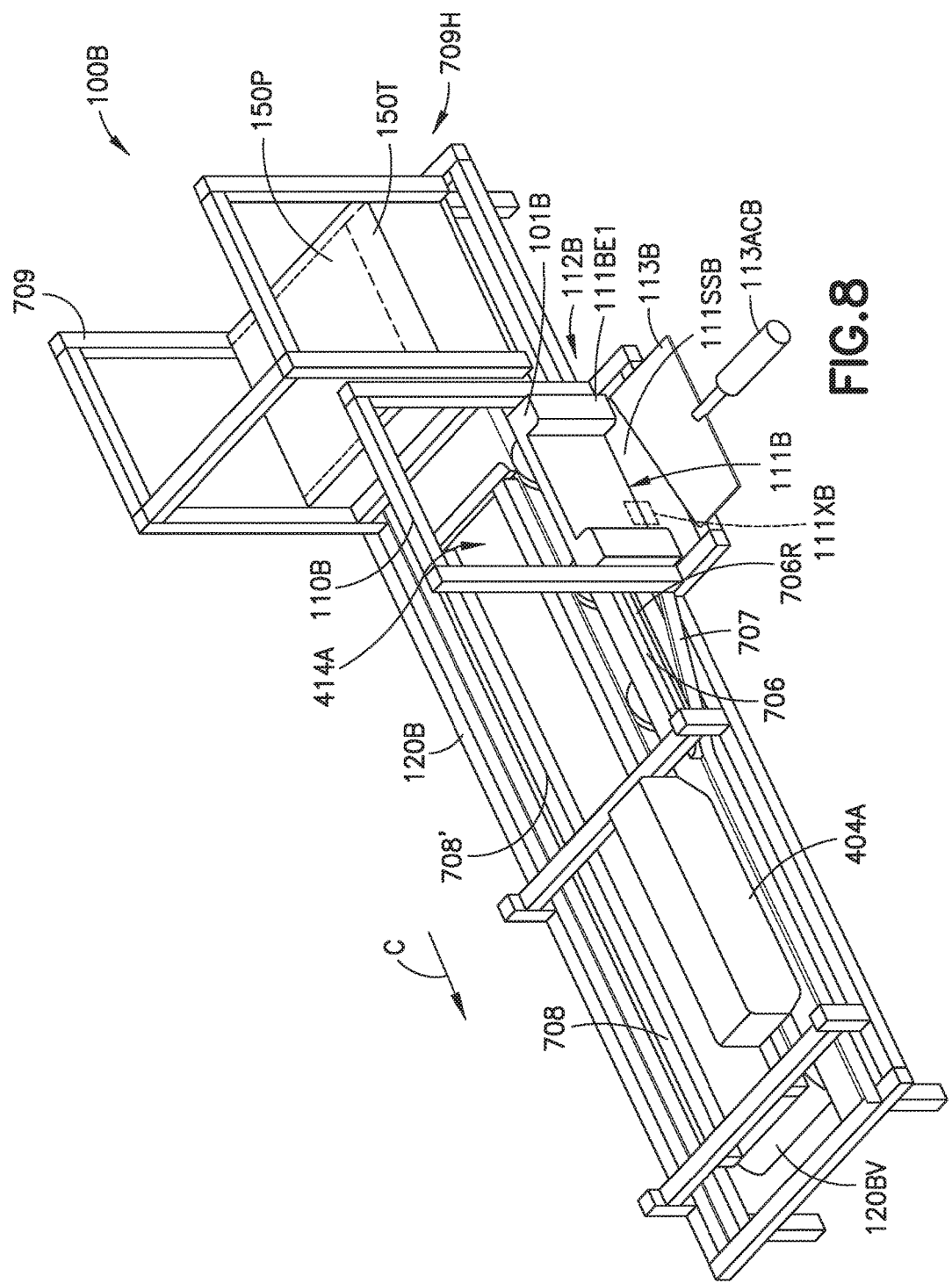
FIGS. 8 and 9 are schematic illustrations of a fitment applicator according to one or more aspects of the present disclosure.
Figure 9:
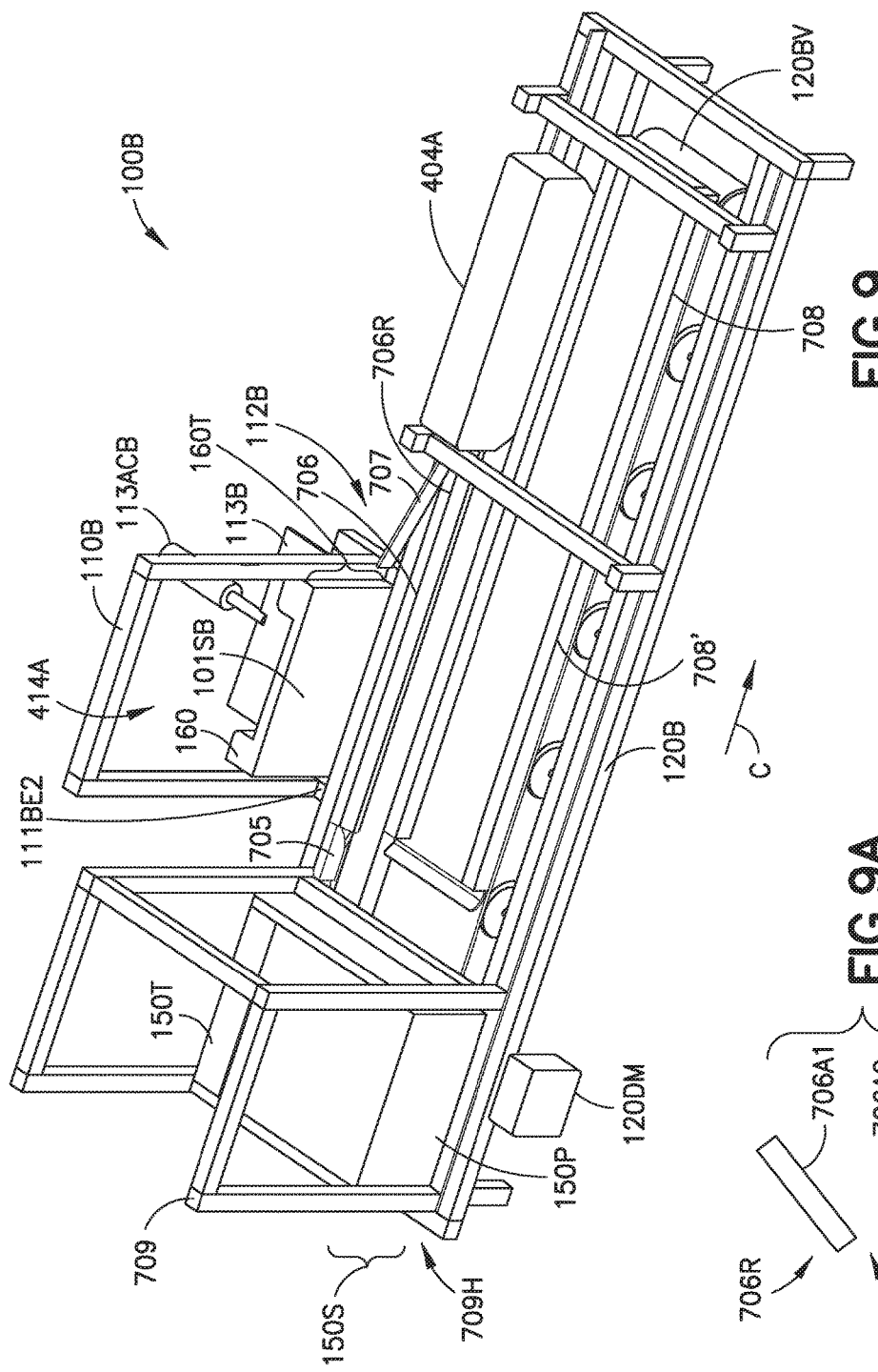
Figure 10:
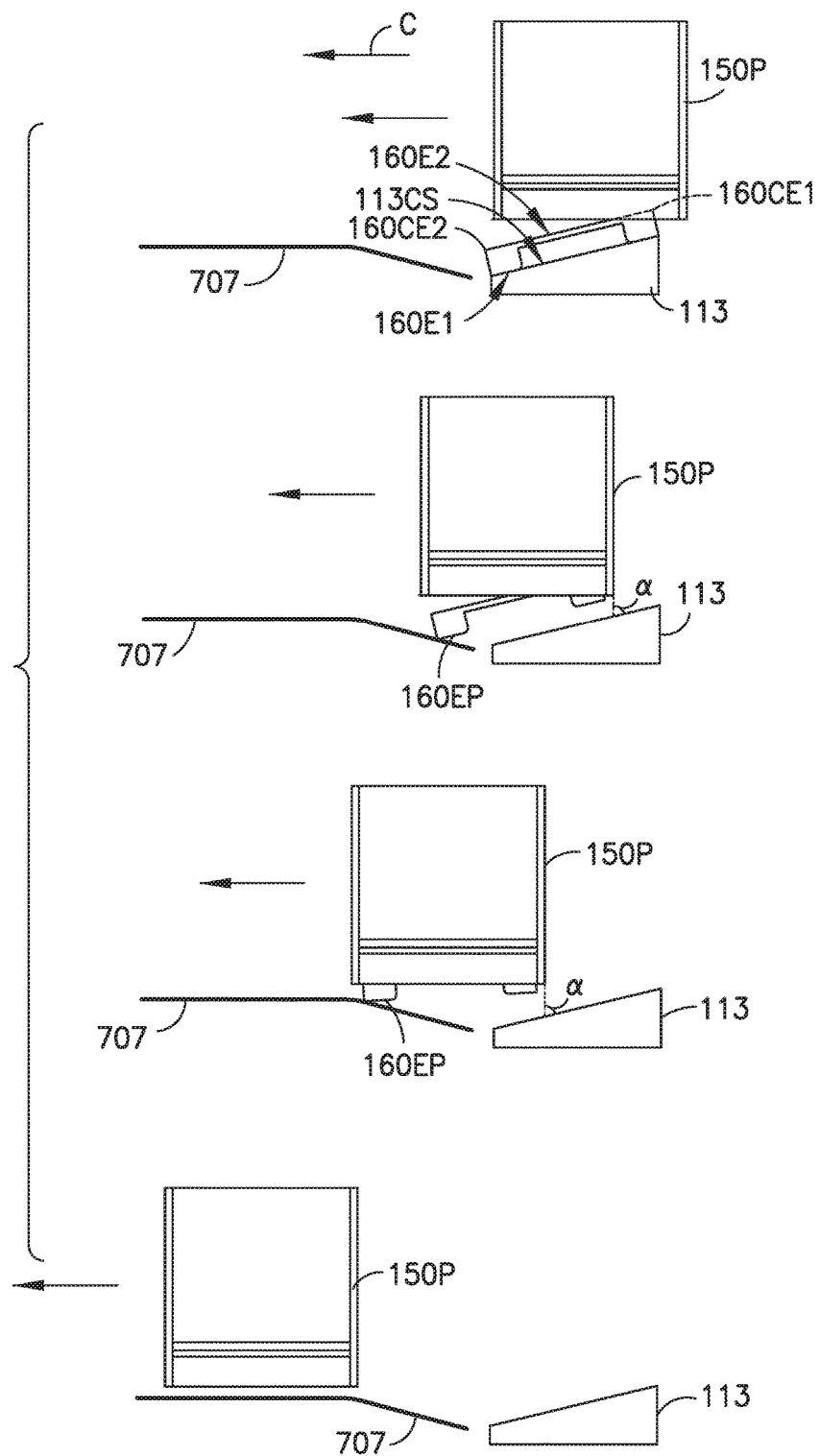
FIG. 10 is a schematic illustration of a portion of a fitment applicator according to one or more aspects of the present disclosure.

Referring to FIGS. 8-10, a continuous automatic fitment applicator 100B, substantially similar to fitment applicator 100 and semi-automatic fitment applicator 100A, is shown. The continuous automatic fitment applicator 100B has a frame 110B, substantially similar to frame 110 and 110A described above. The frame 110B having outlet 111B, including entrance aperture 111BE1, exit aperture 111BE2, and stop surface 111SSB, engagement member 113B, stripper 112B formed by outlet 111B and engagement member 113B, and inlet 414A all substantially similar to those similarly numbered described above. Continuous automatic fitment applicator 100B also has a preloading mechanism 101B, substantially similar to preloading mechanism 101 described above, in cooperation with fitment seat 101SB, substantially similar to fitment seat 101S and 101SA described above.

In one aspect, the continuous automatic fitment applicator 100B additionally includes loading station 709 connected to the frame 110B. The loading station 709 forms a hopper 709H configured for receiving preformed flexible packaging 150P. In one aspect, the loading station 709 holds stacks 150S of preformed flexible packaging 150P. The loading station 709 may be reconfigurable/adjustable to hold variably sized and shaped preformed flexible packaging 150P. Alternatively, the loading station 709 may be fixed such that only a single type of preformed flexible packaging 150P may be utilized.

In one aspect, the continuous automatic fitment applicator 100B has a transport station 120B connected to the frame 110B. The transport station 120B is communicably coupled to the loading station 709, such that the preformed flexible packaging 150P is received by the transport station 120B from the loading station 709 in any suitable manner. For example, the transport station 120B, in one aspect, includes a conveyor 120BV, driven by drive motor 120DM, that passes underneath the loading station 709 so that the preformed flexible packaging 150P are stripped from the stack 150S of preformed flexible packaging 150P, located in the hopper 709H of the loading station 709, by the conveyor 120BV. The preformed flexible packaging 150P may be provided to the transport station 120B by the loading station 709 a single pouch at a time or in any suitable manner. For example, the loading station 709 may be connected to multiple transport stations 120B and may distribute preformed flexible packaging 150P accordingly. In one aspect, the transport station 120B includes a pressure mechanism 708 that biases the performed flexible packaging 150P against conveyor 120BV for establishing a constant driving contact between the conveyor 120BV and the preformed flexible packaging 150P. The pressure mechanism 708 includes a pressure plate 708' disposed above the conveyor 120BV and configured to apply a downward pressure to the preformed flexible packaging 150P for biasing the performed flexible packaging 150P against conveyor 120BV. Alternatively, the preformed flexible packaging 150P may remain in contact with the transport station 120B due to gravity. In some aspects, the conveyor 120BV may be a conveyor loop, while in other aspects, the conveyor 120BV may be a shuttle, or any suitable conveyor to transport the performed flexible packaging 150P.

In one aspect, the continuous automatic fitment applicator 100B also includes a strip fitment guide system 706. The strip fitment guide system 706 is configured to guide strip fitments 160 into the preformed flexible packaging 150P. In one aspect, the strip fitment guide system 706 includes one or more rails or ramps 706R. In one aspect, the rail(s) are arranged relative to one another to form a substantial v-shape, such that there is an opening 7060 between two angled rails 706A1, 706A2 forming a v-shape (see FIG. 9A). In other aspects, the rails 706A1, 706A2 may form any shape such as a U shape or a funnel. In one aspect, the strip fitment guide system 706 also includes a separator 705 that interfaces with the preformed flexible packaging 150P to separate the sides 150S of the preformed flexible packaging 150P at the top 150T, so that strip fitments 160 can be inserted into the preformed flexible packaging 150P. As the preformed flexible packaging 150P move in direction C along the conveyor 120BV, the preformed flexible packaging 150P interfaces with the separator 705, separating the sides 150S of the preformed flexible packaging 150P at the top portion 150T of the preformed flexible packaging 150P. The separator 705 is positioned relative to the rails 706A1, 706A2 such that one side 150S1 of the preformed flexible packaging 150P (see FIG. 3) rides along rail 706A1 and the other side 150S2 of the preformed flexible packaging 150P (see FIG. 3) rides along rail 706A2 to maintain separation of the sides 150S1, 150S2 to keep the top portion 150T opened so that the strip fitment 160S may be inserted between the rails 706A1, 706A2, i.e., through opening 7060, and into the preformed flexible packaging 150P as the preformed flexible packaging 150P is transported past the frame 110A. The rails 706A1, 706A2, are generally angled to facilitate the insertion of the strip fitments 160 into preformed flexible packaging 150P, such that if the flexible strip fitment 160, in the stable closed or un-distended shape, bends or flexes during transfer from the frame 110B to the preformed flexible packaging 150P, the flexible strip fitment 160 interfaces with the rails 706A1, 706A2 and is directed toward opening 7060 and into the preformed flexible packaging 150P. In one aspect, the engagement member 113B, while dispensing strip fitment 160S, extends beyond the exit aperture 111BE2 and pushes the strip fitment 160S through the opening 7060 between rails 706A1, 706A2. In one aspect, generally, the stripped strip fitment 160S may be only partially inserted into the preformed flexible packaging 150P such that an exposed portion 160EP remains uninserted (see FIG. 10).

Referring now also to FIG. 10, in one aspect, continuous automatic fitment applicator 100B also includes a strip fitment guide rail 707 as shown. The strip fitment guide rail 707 is configured for further inserting the stripped strip fitment 160S into the preformed flexible packaging 150P. In other aspects, the strip fitment guide rail 707 may be a moving cam surface, independent or coupled to the actuator 113ACB of the engagement member 113B, the movement of which guides the strip fitment 160 to be further inserted into the flexible packaging 150. In yet other aspects, the strip fitment guide rail 707 may be any suitable guidance system. The partially inserted stripped strip fitment 160S may be further inserted to reach a final position fully inserted into the preformed flexible packaging 150P. The strip fitment guide rail 707 is provided to complete the insertion of the stripped strip fitment 160S to the final position within the preformed flexible packaging 150P. In one aspect, the strip fitment guide rail 707 is a rail, ramp, or any suitable system for inserting the stripped strip fitment 160S. Additionally, the rails 706A1, 706A2 may be configured to prevent the strip fitment 160S from skewing or flexing when the strip fitment 160S contacts the strip fitment guide rail 707 to be further inserted into the preformed flexible packaging 150P.

In one aspect, the continuous auto fitment applicator 100B also has a sealing mechanism 404A substantially similar to the sealing mechanism 404 of the semi-automatic fitment applicator 100A. However, in one aspect, the sealing mechanism 404A is attached to transport station 120B for affixing the strip fitments 160 to the preformed flexible packaging 150P as the preformed flexible packaging 150P travels along conveyor 120BV in direction C. The sealing mechanism 404A may also be a heat sealer, ultrasonic sealer, rotary sealer, or any other suitable sealer.

Figure 11:
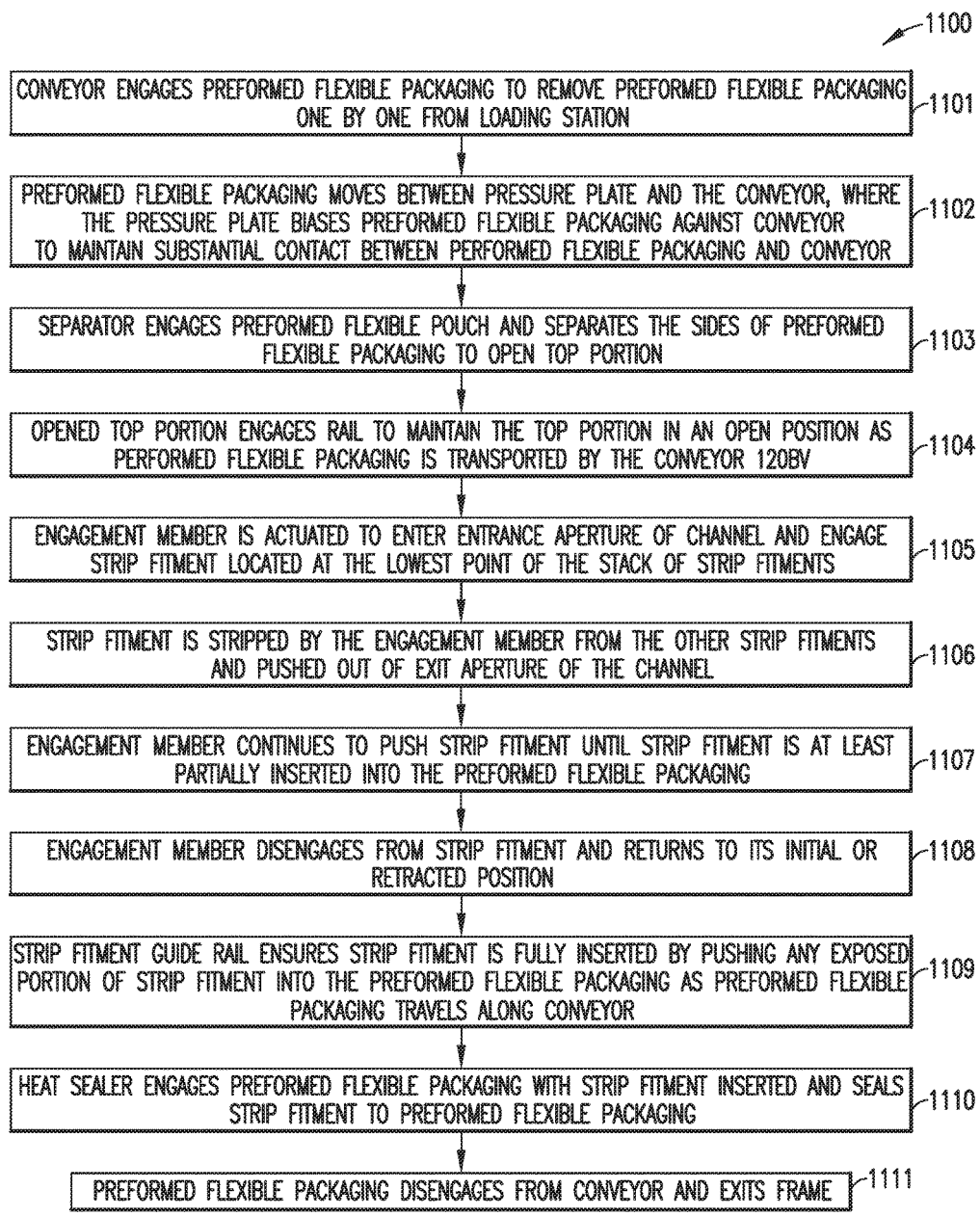
FIG. 11 is a flow chart of a method for mounting strip fitments to flexible packaging with a fitment applicator according to one or more aspects of the present disclosure.

Referring now to FIG. 11, an exemplary flow chart for mounting of the strip fitments 160 into flexible packaging 150, using continuous automatic fitment applicator 100B, is shown. A stack 150S of preformed flexible packaging 150P, with open or unsealed top portion 150T (as seen in FIGS. 3, and 8-9), is placed in loading station 709. The conveyor 120BV engages preformed flexible packaging 150P to remove preformed flexible packaging 150P one by one from loading station 709 (FIG. 11, Block 1101) so that preformed flexible packaging 150P moves in direction C. Preformed flexible packaging 150P moves between pressure plate 708' and the conveyor 120BV, where the pressure plate 708' biases preformed flexible packaging 150P against conveyor 120BV to maintain substantial contact between preformed flexible packaging 150P and conveyor 120BV (FIG. 11, Block 1102). Separator 705, and in one aspect, a vacuum separator similar to separator 403A, engages preformed flexible pouch 150P and separates the sides 150S of preformed flexible packaging 150P to open top portion 150T (FIG. 11, Block 1103). Opened top portion 150T engages rail 706 as described above to maintain the top portion 150T in an open position as preformed flexible packaging 150P is transported in direction C by the conveyor 120BV (FIG. 11, Block 1104). Engagement member 113B is actuated, as described above, to enter entrance aperture 111BE1 of channel 111XB and engage flexible strip fitment 160S, in the stable closed or un-distended shape, located at the lowest point of the stack 160T of other strip fitments 1600 (FIG. 11, Block 1105). Strip fitment 160S is stripped by the engagement member 113B from the other strip fitments 1600 and pushed out of exit aperture 111BE2 of the channel 111XB while being simultaneously at least partially inserted into flexible packaging 150P (FIG. 11, Block 1106) in an angled or pitched orientation similar to that described above. (See also FIG. 10). Engagement member 113B continues to push strip fitment 160S until strip fitment 160S is at least partially inserted into the preformed flexible packaging 150P (FIG. 11, Block 1107) traveling in direction C on conveyor 120BV. As seen in FIG. 10, at least one corner or end of the strip fitment 160S is inserted into preformed flexible packaging 150P such as when engagement member 113B has an angled surface 113CS as described above. Engagement member 113B disengages from strip fitment 160S and returns to its initial or retracted position (FIG. 11, Block 1108). Strip fitment guide rail 707 ensures strip fitment 160S is fully inserted by pushing any exposed portion 160EP of strip fitment 160S into the preformed flexible packaging 150P as preformed flexible packaging 150P travels along conveyor 120BV (FIG. 11, Block 1109). Heat sealer 404A engages preformed flexible packaging 150P with strip fitment 160S inserted and seals strip fitment 160S to preformed flexible packaging 150P (FIG. 11, Block 1111). Preformed flexible packaging 150P disengages from conveyor 120BV and exits frame 110B (FIG. 11, Block 1111).

Figure 12:
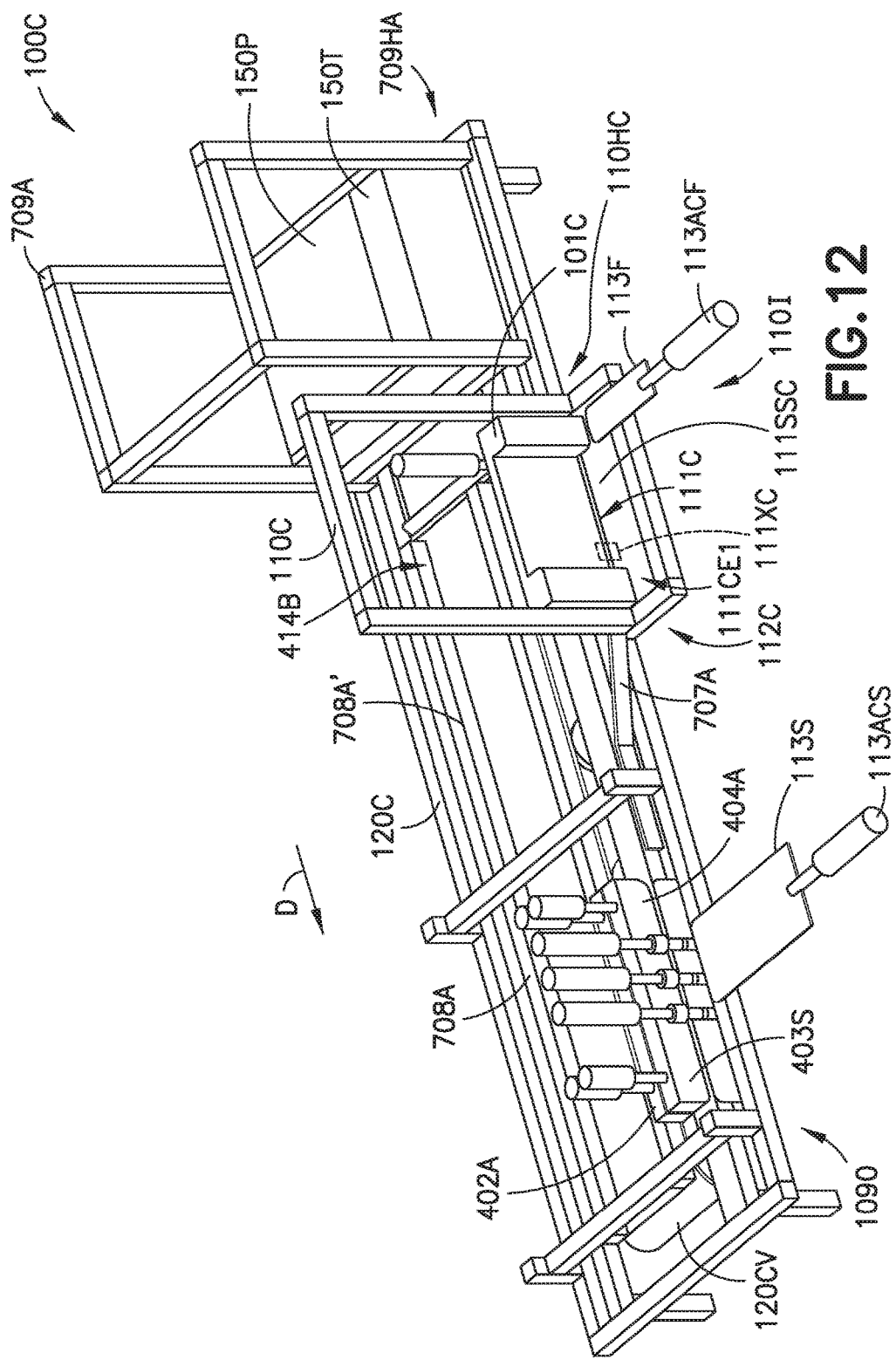
FIGS. 12 and 13 are schematic illustrations of a fitment applicator according to one or more aspects of the present disclosure.
Figure 13:
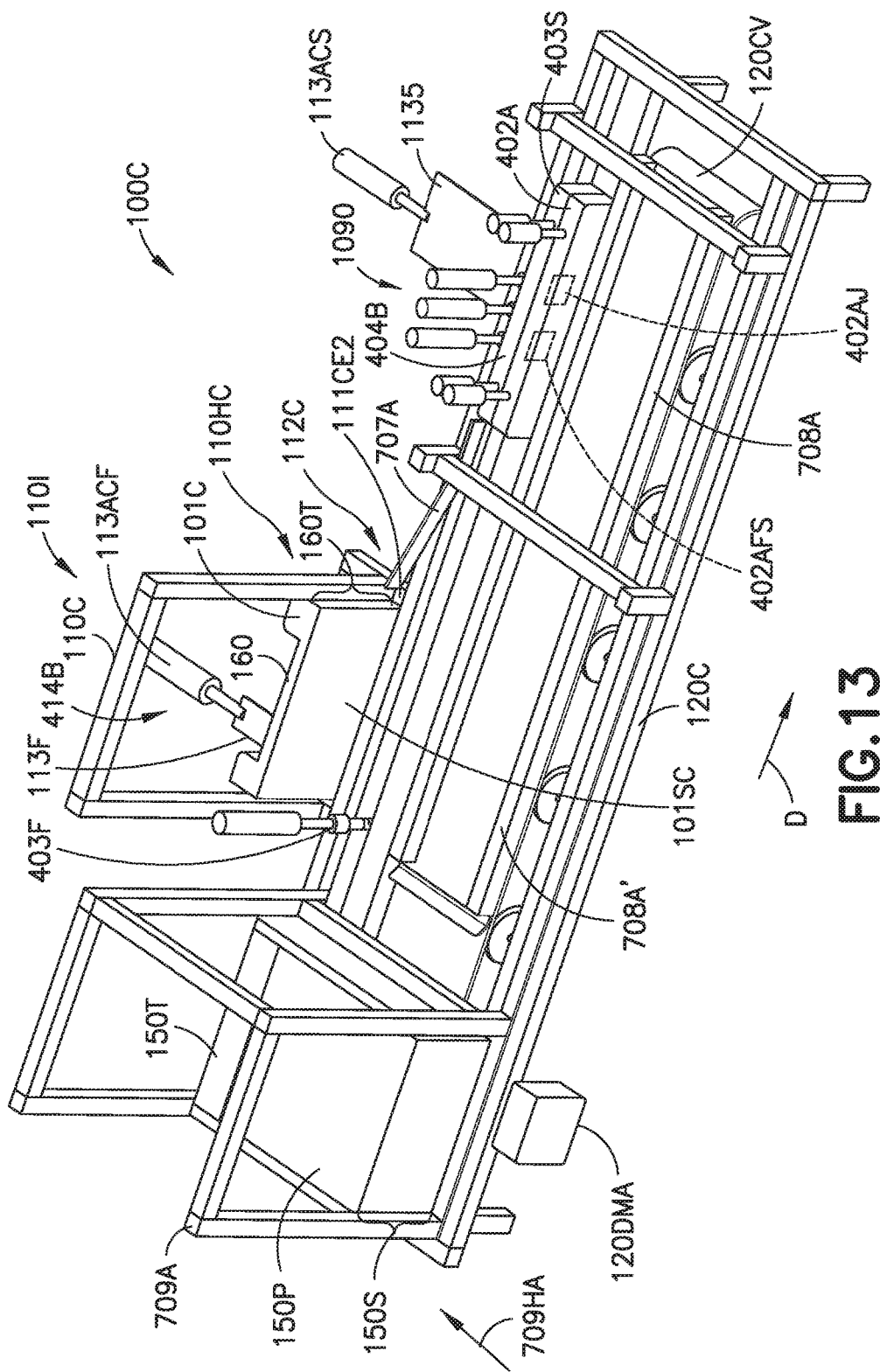

Referring to FIGS. 12-13, a multiple-stage automatic fitment applicator 100C is shown. In this aspect, multiple-stage automatic fitment applicator 100C is substantially similar to continuous automatic fitment applicator 100B, however, the insertion of strip fitment 160 in this aspect is performed in multiple stages. The multiple-stage automatic fitment applicator 100C has a frame 110C, substantially similar to frame 110, 110A, and 110B described above. The frame 110C having outlet 111C, including entrance aperture 111CE1, exit aperture 111CE2, and stop surface 111SSC, a first engagement member 113F, stripper 112C formed by engagement member 113F and outlet 111C, and inlet 414B all substantially similar to those described above. In one aspect, the first engagement member 113F may be positioned to engage the strip fitment 160 at a location offset from a center line of the strip fitment 160. The multiple-stage automatic fitment applicator 100C also has a preloading mechanism 101C (substantially similar to preloading mechanism 101, 101A and 101B), a fitment seat 101SC (substantially similar to fitment seat 101S, 101SA, 101SB), loading station 709A (substantially similar to loading station 709), transport station 120C (substantially similar to transport station 120B), and strip fitment guide system 707A (substantially similar to strip fitment guide system 707). In one aspect, the multiple-stage automatic fitment applicator 100C also includes strip fitment guide rail 706A substantially similar to strip fitment guide rail 706, described above.

In one aspect, the first engagement member 113F, first separator 403F, strip fitment guide system 707A, and strip fitment hopper 110HC of frame 110C forms a strip fitment insertion area 110I. The strip fitment insertion area 110I operates similar to that described above with respect to FIGS. 8-11, such that strip fitment insertion area 110I is configured to guide the flexible strip fitments 160, in a stable closed or un-distended shape, into the preformed flexible packaging 150P. In one aspect, the first separator 403F interfaces with the preformed flexible packaging 150P to separate the sides 150S of the preformed flexible packaging 150P at the top 150T, so that strip fitments 160 can be inserted into the preformed flexible packaging 150P. As the preformed flexible packaging 150P moves in direction D along the conveyor 120CV, first separator 403F may be moved along with the preformed flexible packaging 150P, while maintaining separation of the sides 150S, in direction D. The first engagement member 113F is configured to partially insert the strip fitment 160S into the preformed flexible packaging 150P as the preformed flexible packaging 150P progresses along conveyor 120CV and is separated by first separator 403F. In other aspects, first separator 403F is stationary and does not move along conveyor 120CV with preformed flexible packing 150P. Additionally, in one aspect, the multiple-stage automatic fitment applicator 100C may include a sealing area 1090, disposed along the conveyor 120CV, downstream of the strip fitment insertion area 110I, for sealing the strip fitments 160 into the preformed flexible packaging 150P after insertion. In one aspect, the sealing area 1090 may include clamp 402A, second engagement member 113S, and second separator 403S, similar to the clamp 402, engagement member 113A, and separator 403 of the semi-automatic fitment applicator 100A described above. The clamp 402A being configured to secure the preformed flexible packaging 150P to the transport station 120C for sealing the strip fitments 160 into the preformed flexible packaging 150P. The second separator 403S configured to open a portion of the preformed flexible packaging 150P to further insert a stripped strip fitment 160S previously partially inserted into the preformed flexible packaging 150P by first engagement member 113F. The second engagement member 113S is configured to engage and insert the partially inserted stripped strip fitment 160S into the preformed flexible packaging 150P. As noted above, the second engagement member 113S is substantially similar to engagement member 113A and is configured to insert the strip fitment 160S to a position fully inserted into the preformed flexible packaging 150P that is defined by e.g. the fitment stop 402AFS similar to fitment stop 402FS described above with respect to FIG. 4, generally providing a stop location indicating when the stripped strip fitment 160S is fully inserted to a predetermined depth (e.g. the strip fitment 160 abuts the fitment stop 402AFS) of the clamp 402A (see e.g. FIGS. 4-5). In one aspect, the sealing area 1090 may also include a sealing mechanism 404B, substantially similar to sealing mechanism 404 of the semi-automatic fitment applicator 100A described above. The sealing mechanism 404B is attached to the transport station 120C. The sealing mechanism 404B is configured to seal the stripped strip fitment 160S into the preformed flexible packaging 150P.

Figure 14:
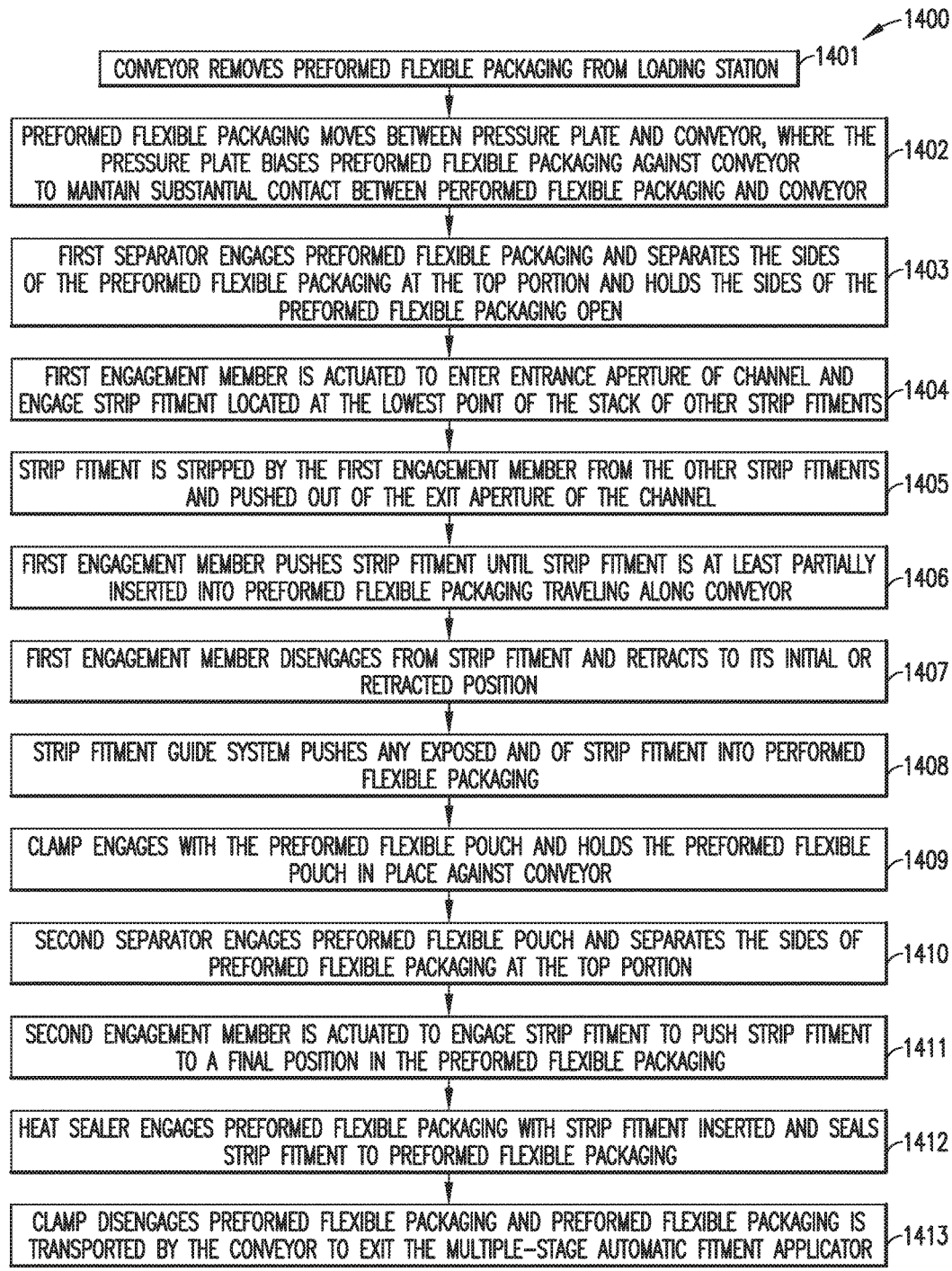
FIG. 14 is a flow chart of a method for mounting strip fitments to flexible packaging with a fitment applicator according to one or more aspects of the present disclosure.
Figure 15:
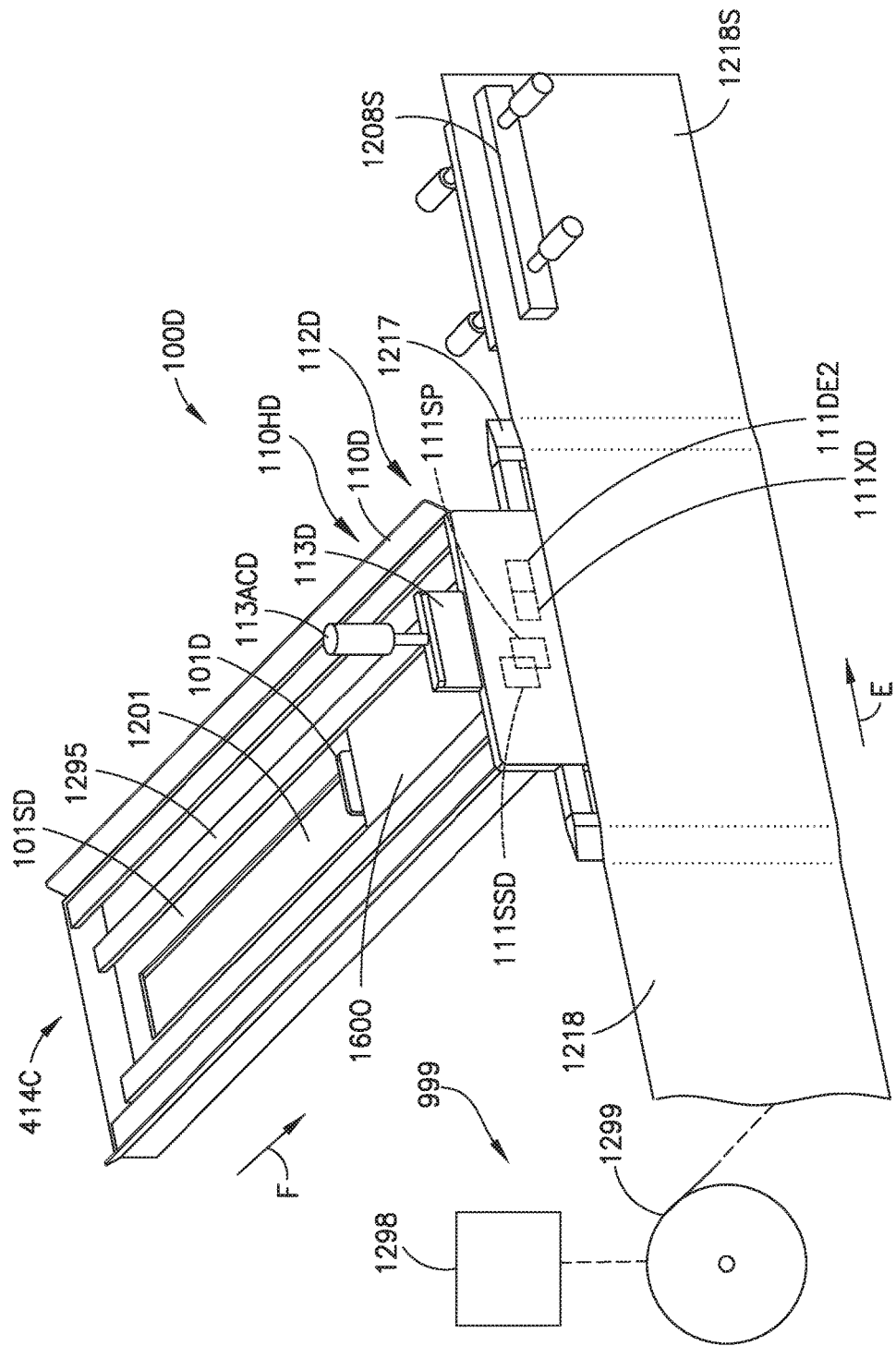
FIGS. 15 and 16 are schematic illustrations of a fitment applicator according to one or more aspects of the present disclosure.
Figure 16:
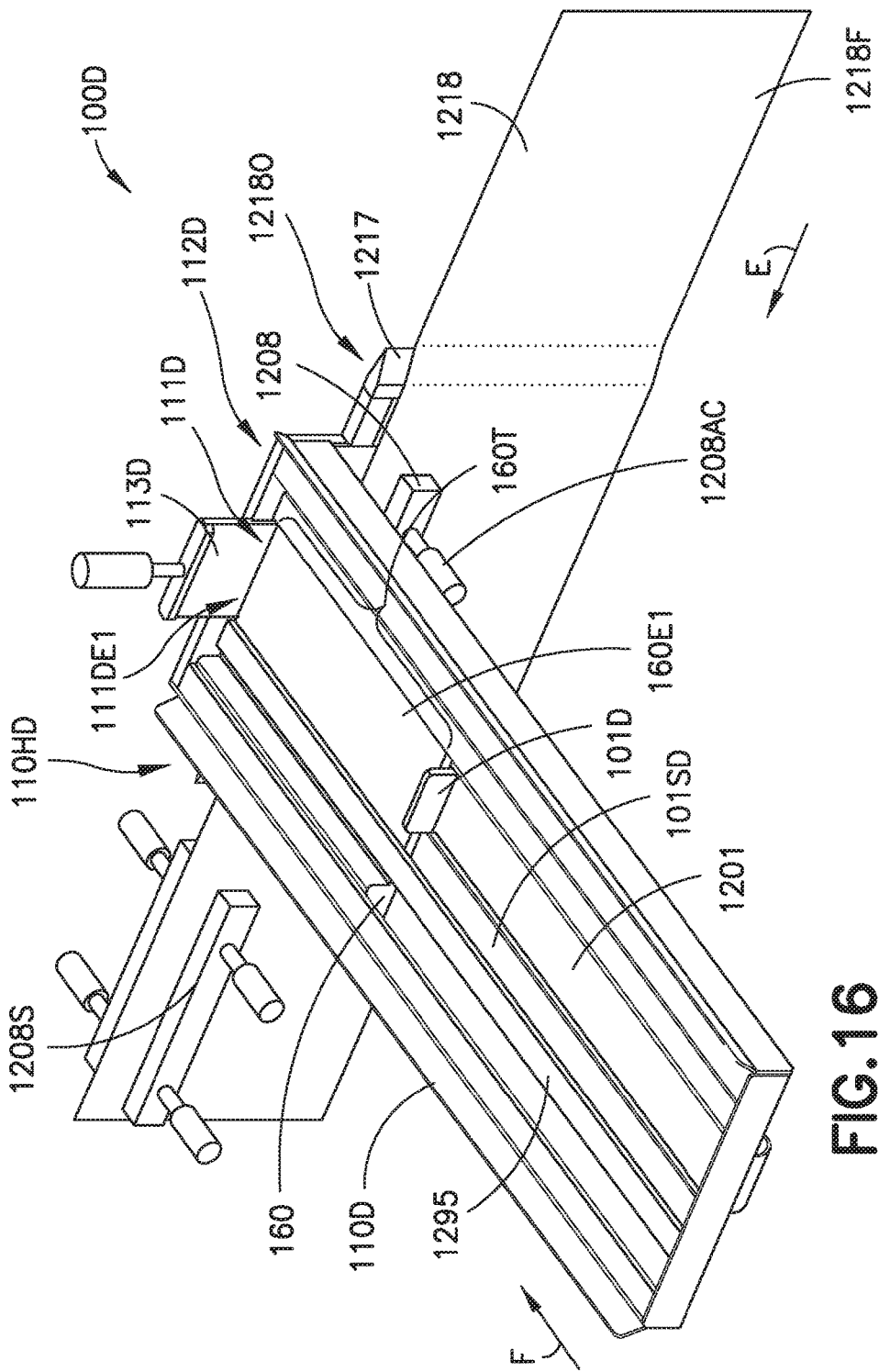
Figure 17:
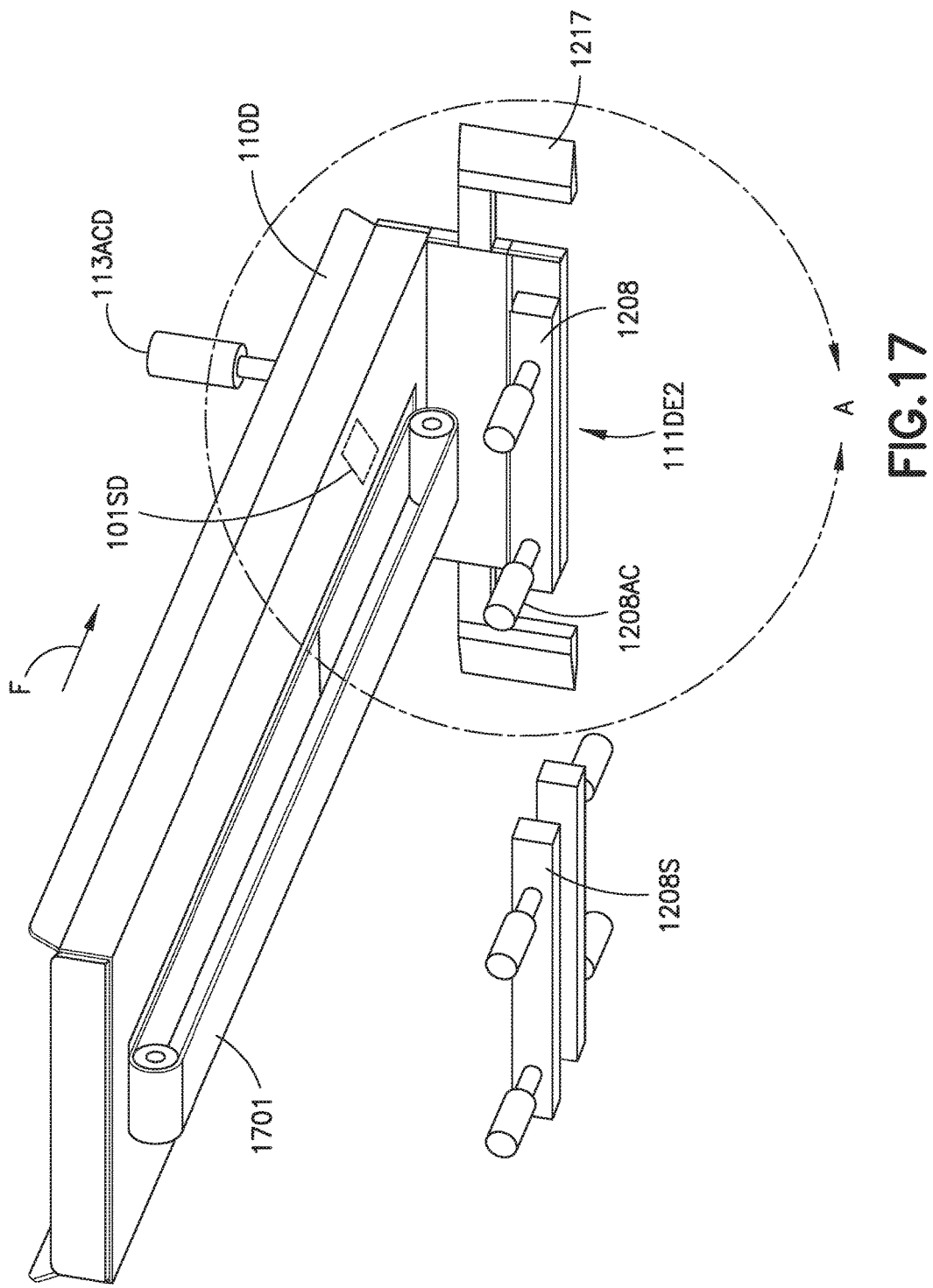
FIG. 17 is a schematic illustration of a portion of a fitment applicator according to one or more aspects of the present disclosure.
Figure 18:
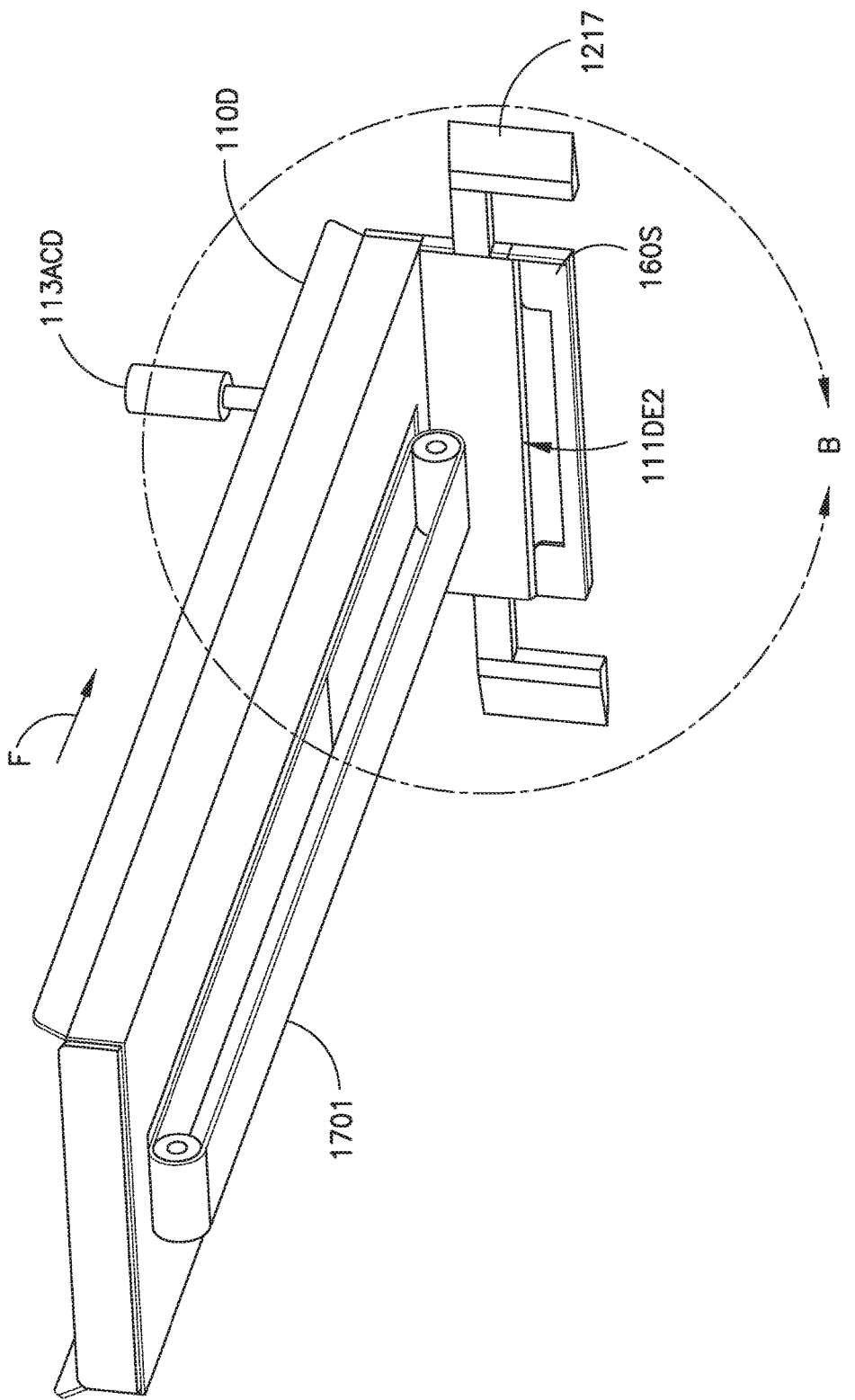
FIG. 18 is a schematic illustration of a portion of a fitment applicator according to one or more aspects of the present disclosure.

Referring now to FIG. 14, an exemplary flow chart 1400 for mounting of strip fitment 160 into flexible packaging 150, using multiple-stage automatic fitment applicator 100C, is shown. A stack 150S of preformed flexible packaging 150P, with top portion 150T, is placed in loading station 709A. Conveyor 120CV, driven by drive motor 120DMA, removes preformed flexible packaging 150P from loading station 709A (FIG. 14, Block 1401) one at a time for transport of preformed flexible packaging 150P in direction D. The preformed flexible packaging 150P moves between pressure plate 708A' and conveyor 120CV, where the pressure plate 708A' biases preformed flexible packaging 150P against conveyor 120CV to maintain substantial contact between preformed flexible packaging 150P and conveyor 120CV (FIG. 14, Block 1402). Conveyor 120CV transports preformed flexible packaging 150P to the strip fitment insertion area 110I. First separator 403F engages preformed flexible packaging 150P and separates the sides of the preformed flexible packaging at the top portion 150T and holds the sides of the preformed flexible packaging 150P open (FIG. 14, Block 1403). First engagement member 113F is actuated to enter entrance aperture 111CE1 of channel 111XC and engage flexible strip fitment 160S, in the stable closed or un-distended shape, located at the lowest point of the stack 160T of other strip fitments 1600 (FIG. 14, Block 1404). Strip fitment 160S is stripped by the first engagement member 113F from the other strip fitments 1600 and pushed out of the exit aperture 111CE2 of the channel 111XC while being simultaneously at least partially inserted into flexible packaging 150P (FIG. 14, Block 1405). First engagement member 113F pushes strip fitment 160S, in the stable closed or un-distended shape, until strip fitment 160S is at least partially inserted into preformed flexible packaging 150P traveling along conveyor 120CV (FIG. 14, Block 1406) in direction D. In one aspect, the first engagement member 113F inserts the strip fitment 160S into preformed flexible packaging 150P in a pitched or angled orientation (see FIG. 10), where one end of the strip fitment 160S is contained within preformed flexible packaging 150P opening and the opposite end of 160S is exposed from preformed flexible packaging 150P. First engagement member 113F disengages from strip fitment 160S and retracts to its initial or retracted position (FIG. 14, Block 1407). Strip fitment guide system 707A pushes any exposed end 160EP of strip fitment 160S into performed flexible packaging 150P as preformed flexible packaging 150P is moved by conveyor 120CV (FIG. 14, Block 1408) in direction D. The preformed flexible packaging 150P with strip fitment 160S inserted therein is transported by conveyor 120CV to sealing area 1090 where clamp 402A engages with the preformed flexible pouch 150P and holds the preformed flexible pouch 150P in place against conveyor 120CV (FIG. 14, Block 1409). Second separator 403S engages preformed flexible pouch 150P and separates the sides of preformed flexible packaging 150P at the top portion 150T (FIG. 14, Block 1410). Second engagement member 113S is actuated to engage strip fitment 160S to push strip fitment 160S to a final position in the preformed flexible packaging 150P (FIG. 14, Block 1411) as described above so that strip fitment 160S abuts a stop location on the clamp jaw 402AJ indicating when the stripped strip fitment 160S is fully inserted to a predetermined depth (e.g. the strip fitment 160 abuts the stop location). Heat sealer 404B engages preformed flexible packaging 150P with strip fitment 160S inserted and seals strip fitment 160S to preformed flexible packaging 150P (FIG. 14, Block 1412). Clamp 402A disengages preformed flexible packaging 150P and preformed flexible packaging 150P is transported by the conveyor 120CV to exit the multiple-stage automatic fitment applicator 100C (FIG. 14, Block 1413). In this aspect, the conveyor 120CV may stop when preformed flexible packaging 150P is located at the strip fitment insertion area 110I and sealing area 1090 so that first and second engagement members 113F, 113S, clamp 402A, and first and second separators 403F, 403S can be actuated. In other aspects, the first and second engagement members 113F, 113S, clamp 402A, and first and second separators 403F, 403S may be movable so that the strip fitment 160S can be inserted and sealed without stopping the conveyor 120CV.

Referring now to FIGS. 15-18A, a vertical form fill sealing (VFFS)/horizontal form fill sealing (HFFS) fitment applicator 100D is shown. The VFFS/HFFS fitment applicator 100D includes generally, a fitment applicator substantially similar to fitment applicators 100/100A/100B/100C described above, and a flexible packaging machine 999. In one aspect, the flexible packaging machine 999 is an HFFS flexible packaging machine. In other aspects, the flexible packaging machine 999 is a VFFS flexible packaging machine. The VFFS/HFFS fitment applicator 100D produces flexible packaging with processes generally known in the art, for example, such as providing film 1218 from a sheet roll 1299, forming the film 1218 into a bag and sealing the formed bag. In one aspect, the VFFS/HFFS fitment applicator 100D is positioned on the flexible packaging machines 999 in at least one location along a path of travel of the film 1218 (e.g., at any point along the length of the flexible packaging machine 999). For example, the VFFS/HFFS fitment applicator 100D may be disposed at a location along a length of the film 1218 before forming flexible packaging 150, after forming flexible packaging 150, before side seal of the flexible packaging 150, or after side seal of flexible packaging 150. In one aspect, systems of the VFFS/HFFS fitment applicator 100D, such as, for example, actuation or a timing system, are connected to a control 1298 of the flexible packaging machine 999. The VFFS/HFFS fitment applicator 100D is substantially similar to the fitment applicators 100, 100A, 100B, 100C described herein, and includes frame 110D that is substantially similar to frame 110, outlet 111D, including entrance aperture 111DE1, exit aperture 111DE2, and stop surface 111SSD, that is substantially similar to outlets 111/111A/111B/111C, engagement member 113D, that is substantially similar to engagement members 113/113A/113B/113C actuated by actuator 113ACD that is substantially similar to actuators 113AC/113ACA/113ACB/113ACF/113ACS, stripper 112D formed by engagement member 113D and outlet 111D, substantially similar to stripper 112/112A/112B/112C, and inlet 414C, that is substantially similar to inlet 414/414A/414B. In this aspect, the outlet 111D includes a stop surface 111SSD generally orthogonal with an axial direction of the hopper 110HD of the frame 110D. In one aspect, the stop surface 111SSD includes a sliding protrusion 111SP or lip allowing the strip fitment 160 to slide from the outlet 111D to a region proximate the opening of a flexible package 150 or opening of film 1218. In one aspect, the sliding protrusion 111SP includes a cover that retains strip fitment 160 as strip fitment 160 slides down the sliding protrusion 111SP. Additionally, the VFFS/HFFS fitment applicator 100D, in one aspect may include preloading mechanism 101D in cooperation with fitment seat 101SD (substantially similar to fitment seat 101S, 101SA, 101SB, 101SC), the preloading mechanism 101D including, for example a spring loaded mechanism 1201 or a conveyor belt mechanism 1701 that engages the strip fitment 160 in the stack 160T of strip fitments 160 and biases the strip fitments 160 toward the outlet 111D in direction F. These preloading mechanisms are substantially similar to preloading mechanisms 101/101A/101B/101C described above. The VFFS/HFFS fitment applicator 100D also includes, in one aspect, one or more posts 1295 inside or connected to frame 110D for guiding movement of the strip fitments 1600 and stabilizing the strip fitments 1600 during movement of the strip fitments 1600 within the frame 110D, as each strip fitment 160S is stripped. Additionally, the strip fitments 160 may, in one aspect, include holes where the post 1295 passes through the holes for guiding movement of the strip fitments 1600 in direction F. In other aspects, the post 1295 interfaces with the edge 160E1 of the strip fitments 160. The post 1295 may have any suitable configuration, such as, cylindrical or substantially square.

In one aspect, the VFFS/HFFS fitment applicator 100D includes a wedge separator 1217, also referred to as a film separator, for film 1218 being processed through the flexible packaging machine 999. In one aspect, 1217 is connected to sliding protrusion 111SP. In one aspect, the film 1218 is fed horizontally or vertically through the flexible packaging machine 999 and interfaces with the wedge separator 1217 being separated to create an opening 12180 between the film 1218 for insertion of the strip fitments 160. Opening 12180 is configured so that the strip fitment 160 may be inserted therebetween and sealed between the separated film 1218. In one aspect, to seal the strip fitments 160 to the film 1218, the VFFS/HFFS fitment applicator 100D includes sealing jaw(s) 1208. In one aspect, the sealing jaw(s) 1208 are situated opposite one another proximate the outlet 111D and sliding protrusion 111SP of the VFFS/HFFS fitment applicator 100D. In other aspects, the sealing jaw(s) 1208 are coupled to an actuator 1208AC, which opens and closes the sealing jaw(s) 1208 as strip fitment 160 is placed between film 1218. The actuation of the sealing jaw(s) 1208 may be controlled, for example, by the control 1298 of flexible packaging machine 999. In other aspects, a second sealing jaw(s) 1208S, which may be located further downstream in direction E from jaws 1208 of the VFFS/HFFS fitment applicator 100D. The sealing jaw(s) 1208 and 1208S may be a heat sealer, ultrasonic sealer, or any other suitable sealer. The strip fitments 160 are dispensed between the sliding protrusion 111SP and the sealing jaw(s) 1208. The sealing jaw(s) 1208 bond the strip fitment 160 to one side of the film 1218. As the film 1218 moves in direction E, the film 1218 with bonded strip fitment 160 interface with sealing jaw(s) 1208S which bonds the strip fitment 160 to the other side of film 1218. In another aspect, there may be only one sealing jaw 1208 which provides sealing of the strip fitment 160 to both sides of the film 1218.

Figure 19:
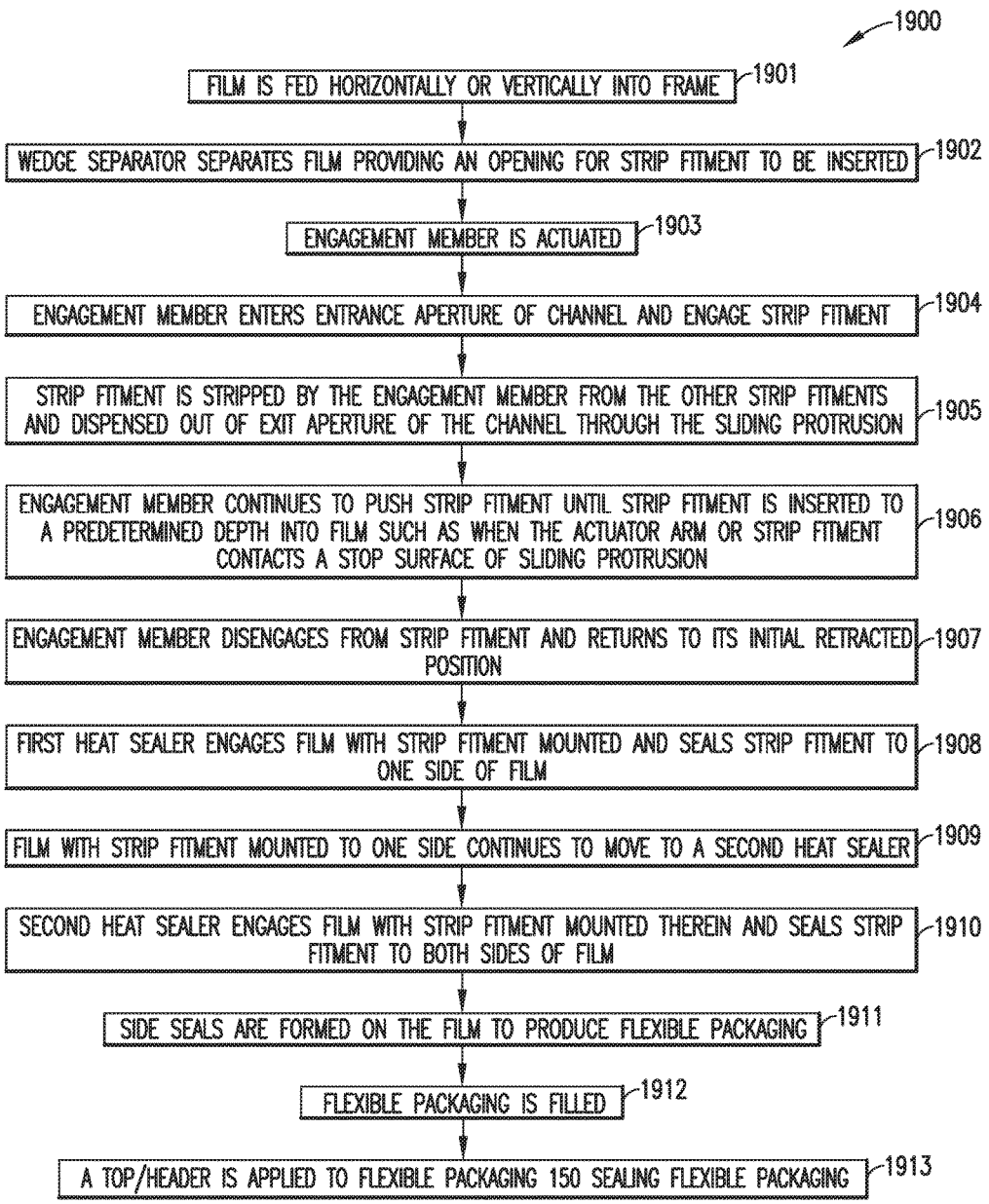
FIG. 19 is a flow chart of a method for mounting strip fitments to flexible packaging with a fitment applicator according to one or more aspects of the present disclosure.

Referring now to FIG. 19, an exemplary flow chart 1900 for mounting of strip fitment 160 into film 1218, using VFFS/HFFS fitment applicator 100D is shown. Film 1218 is fed horizontally or vertically into frame 110D (FIG. 19, Block 1901). Wedge separator 1217 separates film 1218 providing an opening for strip fitment 160S to be inserted (FIG. 19, Block 1902). Engagement member 113D is actuated (FIG. 19, Block 1903) to enter entrance aperture 111DE1 of channel 111XD and engage strip fitment 160S (FIG. 19, Block 1904). Strip fitment 160S is stripped by the engagement member 113D from the other strip fitments 1600 and dispensed out of exit aperture 111DE2 of the channel 111XD through the sliding protrusion 111SP (FIG. 19, Block 1905). Engagement member 113D continues to push strip fitment 160S such that the strip fitment 160S is simultaneously inserted to a predetermined depth into film 1218 such as when the actuator arm or strip fitment 160 contacts a stop surface 111SSD of sliding protrusion 111SP (FIG. 19, Block 1906). Engagement member 113D disengages from strip fitment 160S and returns to its initial retracted position (FIG. 19, Block 1907). First heat sealer 1208 engages film 1218 with strip fitment 160S mounted and seals strip fitment 160S to one side 1218F of film 1218 (FIG. 19, Block 1908). Film 1218 with strip fitment 160S mounted to one side continues to move in direction E to a second heat sealer 1208S (FIG. 19, Block 1909). Second heat sealer 1208S engages film 1218 with strip fitment 160S mounted therein and seals strip fitment 160S to both sides 1218S of film 1218 (FIG. 19, Block 1910). Side seals are formed on the film 1218 to produce flexible packaging 150 (FIG. 19, Block 1911). Flexible packaging 150 is filled with any suitable material (FIG. 19, Block 1912). A top/header is applied to flexible packaging 150, in effect, sealing flexible packaging 150 (FIG. 19, Block 1913).

In accordance with one or more aspects of the disclosed embodiment a fitment mounting apparatus for mounting a hold open fitment to flexible packaging is provided, wherein the hold open fitment has a flexible configuration variable between a first un-distended shape and a second stably distended shape. The apparatus including a frame forming a holder configured for holding more than one of the hold open fitments within the holder, a flexible packaging positioning system arranged for positioning flexible packaging for mounting the hold open fitment to the flexible packaging, and an applicator coupled to the frame configured to engage at least one edge of the hold open fitment in the holder and bias the at least one edge so that the hold open fitment is singulated, from others of the more than one hold open fitments in the holder, and issued from the holder into the flexible packaging on the flexible packaging positioning system substantially simultaneous with singulation.

In accordance with one or more aspects of the disclosed embodiment the applicator comprises a actuator and a fitment dispenser coupled to the frame.

In accordance with one or more aspects of the disclosed embodiment the actuator includes an actuated member having a contact surface, the contact surface configured to engage the at least one edge of the hold open fitment, and wherein actuation of the actuator provides the bias of the at least one edge, and provides dispensing of the hold open fitment from the holder through the fitment dispenser to issue the hold open fitment into the flexible packaging.

In accordance with one or more aspects of the disclosed embodiment the contact surface of the actuated member is angled.

In accordance with one or more aspects of the disclosed embodiment the frame includes a fitment seat configured to engage another edge of the hold open fitment, opposite the at least one edge biased by the actuator.

In accordance with one or more aspects of the disclosed embodiment the frame includes a fitment stop configured to stop the hold open fitment in a position for issue into the flexible packaging.

In accordance with one or more aspects of the disclosed embodiment the fitment seat and the fitment stop are positioned to form a gap therebetween, the gap sized and shaped substantially conformal to a dimension of no more than one hold open fitment and the gap admitting passage of no more than one hold open fitment through the gap so that the hold open fitment biased at the at least one edge is simultaneous singulated and issued.

In accordance with one or more aspects of the disclosed embodiment the actuated member is movably coupled to the frame, the actuated member configured to move between a first position and a second position in a direction the hold open fitment issues from the fitment dispenser.

In accordance with one or more aspects of the disclosed embodiment the actuated member in the first position is disposed so that an offset hold open fitment in the holder is movable within the holder to align the at least one edge of the hold open fitment with the contact surface of the actuator.

In accordance with one or more aspects of the disclosed embodiment the actuated member in the second position is extended through the fitment dispenser so that the hold open fitment is issued and at least partially inserted into the flexible packaging.

In accordance with one or more aspects of the disclosed embodiment the fitment dispenser is orientated so that the hold open fitment issues from the fitment dispenser in a direction that effects insertion of the hold open fitment into the flexible packaging.

In accordance with one or more aspects of the disclosed embodiment the flexible packaging positioning system comprises a platform support.

In accordance with one or more aspects of the disclosed embodiment the platform support includes reference members for positioning the flexible packaging relative to the applicator.

In accordance with one or more aspects of the disclosed embodiment the reference members are configured to be adjusted for accommodation of different sized and shaped flexible packaging.

In accordance with one or more aspects of the disclosed embodiment the applicator further comprises a preloading mechanism configured to position each of the more than one hold open fitment for singulation by the applicator after singulation of a previous hold open fitment.

In accordance with one or more aspects of the disclosed embodiment the preloading mechanism is at least one of a gas spring or a weight.

In accordance with one or more aspects of the disclosed embodiment the apparatus further comprises a clamp mechanism coupled to the flexible packaging positioning system, the clamp mechanism configured to secure the flexible packaging to the flexible packaging positioning system relative to the applicator.

In accordance with one or more aspects of the disclosed embodiment the clamp mechanism is configured to contact an external surface of the flexible packaging.

In accordance with one or more aspects of the disclosed embodiment the clamp mechanism includes a fitment stop defining a reference point for indication that the hold open fitment is inserted into the flexible packaging.

In accordance with one or more aspects of the disclosed embodiment the apparatus further comprises a separator coupled to the flexible packaging positioning system, the separator configured to interface with the flexible packaging and separate the flexible packaging for insertion of the hold open fitment.

In accordance with one or more aspects of the disclosed embodiment an opening on at least one side of the flexible packaging is unsealed so that the separator flares the opening along a full opening width.

In accordance with one or more aspects of the disclosed embodiment the hold open fitment spans the full opening width on complete insertion into the flexible packaging In accordance with one or more aspects of the disclosed embodiment the apparatus further comprises a sealing mechanism coupled to the flexible packaging positioning system, the sealing mechanism configured to seal the hold open fitment into the flexible packaging.

In accordance with one or more aspects of the disclosed embodiment the sealing mechanism comprises at least one of a heat seal or an ultrasonic seal.

In accordance with one or more aspects of the disclosed embodiment the apparatus further comprises a loading station coupled to the flexible packaging positioning system, the loading station configured to receive one or more flexible packaging and to distribute the one or more flexible packaging to the flexible packaging positioning system.

In accordance with one or more aspects of the disclosed embodiment at least a portion of the flexible packaging positioning system comprises a transport system configured to transport flexible packaging from the loading station to the applicator.

In accordance with one or more aspects of the disclosed embodiment the transport system is at least one of a conveyor belt or a shuttle.

In accordance with one or more aspects of the disclosed embodiment the transport system includes a guide system oriented so that an at least partially inserted hold open fitment is guided to be fully inserted upon contact with the guide rail.

In accordance with one or more aspects of the disclosed embodiment the flexible packaging positioning system is a VFFS packaging system.

In accordance with one or more aspects of the disclosed embodiment the flexible packaging positioning system is an HFFS packaging system.

In accordance with one or more aspects of the disclosed embodiment the apparatus further comprises a film separator coupled to the frame, the film separator arranged so that as the film contacts the film separator, the flexible packaging is separated for insertion of the hold open fitment into the flexible packaging.

In accordance with one or more aspects of the disclosed embodiment a fitment applicator including a frame configured to store strip fitments, the frame having an outlet configured to dispense the stored strip fitments, a support communicatively coupled to a first end of the outlet, the support configured to support a container, and an engagement member communicatively coupled to a second end of the outlet aligned opposite the first end, the engagement member configured to operate in cooperation with the outlet, forming a stripper, wherein the stripper is configured to interface with the stored strip fitments and strip the stored strip fitments one at a time, coincident with each stripped strip fitment being dispensed through the first end of the outlet and inserted into a respective container.

In accordance with one or more aspects of the disclosed embodiment an opening on at least one side of the container is unsealed so that a separator flares the opening along a full opening width.

In accordance with one or more aspects of the disclosed embodiment the engagement member interfaces with the stored strip fitments and strips the stored strip fitments one at a time.

In accordance with one or more aspects of the disclosed embodiment the engagement member dispenses the stripped strip fitment through the first end of the outlet.

In accordance with one or more aspects of the disclosed embodiment the engagement member is angled such that the stripped strip fitment is dispensed at an angle.

In accordance with one or more aspects of the disclosed embodiment the outlet is configured such that no more than a single stripped strip fitment passes through the outlet at a time.

In accordance with one or more aspects of the disclosed embodiment the outlet and support are configured such that each stripped strip fitment being inserted into the respective container is substantially coincident with the stripped strip fitment dispensing from the outlet.

In accordance with one or more aspects of the disclosed embodiment the strip fitments are stored in a substantially vertical configuration.

In accordance with one or more aspects of the disclosed embodiment the strip fitments are stored in a substantially horizontal configuration.

In accordance with one or more aspects of the disclosed embodiment the stripper is configured such that interface with the stored strip fitments occurs with a single strip fitment at a time.

In accordance with one or more aspects of the disclosed embodiment the stripper is sized and shaped so that it is substantially complementary to an engagement edge of the stored strip fitments, wherein during interface with the stored strip fitment, the stripper contacts the engagement edge of a single strip fitment without contacting any adjacent stored strip fitment.

In accordance with one or more aspects of the disclosed embodiment the stripper is configured such that each stripped strip fitment is partially inserted into the container.

In accordance with one or more aspects of the disclosed embodiment the fitment applicator further including a transport system, at least a portion of which forms the support, and a loading station coupled to the transport system and configured to receive containers, wherein the transport system is configured to transport the containers from the loading station to the frame.

In accordance with one or more aspects of the disclosed embodiment the fitment applicator further comprises a pressure plate configured to provide a substantially consistent contact between the transport system and the containers.

In accordance with one or more aspects of the disclosed embodiment the fitment applicator further comprises a vacuum separator configured to interface with the containers.

In accordance with one or more aspects of the disclosed embodiment the fitment applicator further comprises a guide rail configured to interface with at least one of the containers or the stripped strip fitment.

In accordance with one or more aspects of the disclosed embodiment the fitment applicator further comprises a sealing mechanism configured to seal the stripped strip fitment into the container.

In accordance with one or more aspects of the disclosed embodiment a fitment applicator system including a loading station configured to receive one or more flexible packaging, a transport system coupled to the loading station, the transport system configured to transport the one or more flexible packaging, and a fitment station coupled to the transport system and configured to store strip fitments, the fitment station having an outlet in communication with the transport system, the outlet configured to dispense the stored strip fitments, and an engagement member communicatively coupled to and substantially aligned with the outlet, the engagement member configured to operate in cooperation with the outlet, forming a stripper, wherein the stripper is configured so that the engagement member interfaces with the stored strip fitments and strips the stored strip fitments one at a time, coincident with dispensing each stripped strip fitment, effected by the engagement member extending through the outlet, and insertion of each stripped strip fitment into a respective flexible packaging.

In accordance with one or more aspects of the disclosed embodiment the transport system is coupled to a first end of the outlet and the engagement member is coupled to a second end of the outlet substantially aligned with the first end.

In accordance with one or more aspects of the disclosed embodiment the stripper dispenses the stripped strip fitment through the second end of the outlet.

In accordance with one or more aspects of the disclosed embodiment the engagement member is sized and shaped so that it is substantially complementary to an engagement edge of the stored strip fitments, wherein during interface with the stored strip fitments, the engagement member contacts the engagement edge of a single strip fitment without contacting any adjacent stored strip fitments.

In accordance with one or more aspects of the disclosed embodiment the stripper is configured such that each stripped strip fitment is at least partially inserted into the flexible packaging.

In accordance with one or more aspects of the disclosed embodiment the fitment applicator system further includes one or more guide system coupled to at least the transport system, the one or more guide system configured to interface with the at least partially inserted stripped strip fitment and further insert the at least partially inserted stripped strip fitment into the flexible packaging.

In accordance with one or more aspects of the disclosed embodiment the engagement member is movably coupled to the frame, the engagement member configured to move between a first position and a second position in a direction the stripped strip fitment issues from the stripper.

In accordance with one or more aspects of the disclosed embodiment the stripper is orientated so that the stripped strip fitment issues from the outlet in a direction that effects insertion of the stripped strip fitment into the flexible packaging.

In accordance with one or more aspects of the disclosed embodiment a fitment applicator including a loading station configured to receive one or more flexible packaging, a transport system coupled to the loading station, the transport system configured to transport the one or more flexible packaging, a fitment station coupled to the transport system and configured to store strip fitments, the fitment station having an outlet in communication with the transport system at a first end, the first end of the outlet configured to dispense the stored strip fitments, and an engagement member communicatively coupled to and substantially aligned with the outlet, the engagement member configured to operate in cooperation with the outlet, forming a stripper, wherein the stripper is configured so that the engagement member interfaces with the stored strip fitments and strips the stored strip fitments one at a time, coincident with a dispense of each stripped strip fitment, effected by the engagement member extending through the outlet, and at least partial insertion of each stripped strip fitment into a respective flexible packaging and one or more guide system coupled to at least the transport system, the one or more guide system configured to interface with the at least partial inserted stripped strip fitment and further insert the at least partial inserted stripped strip fitment, and the guide system oriented so as to guide the respective flexible packaging with the further inserted stripped strip fitment into a sealing mechanism.

In accordance with one or more aspects of the disclosed embodiment the further insertion of the stripped strip fitment comprises positioning the stripped strip fitment in a final position of the stripped strip fitment In accordance with one or more aspects of the disclosed embodiment the fitment applicator further comprises a clamp defining a reference point and coupled to the transport system, the clamp configured to secure the respective flexible packaging with the at least partial inserted stripped strip fitment to the transport system.

In accordance with one or more aspects of the disclosed embodiment the fitment applicator further comprises a second engagement member coupled to the clamp, the second engagement member configured to engage the further inserted stripped strip fitment for placement at a final position defined by the reference point.

In accordance with one or more aspects of the disclosed embodiment the transport system is coupled to the first end of the outlet and the engagement member is coupled to a second end of the outlet substantially aligned with the first end.

In accordance with one or more aspects of the disclosed embodiment the stripper dispenses the stripped strip fitment through the second end of the outlet.

In accordance with one or more aspects of the disclosed embodiment a fitment applicator including a loading station configured to receive one or more flexible packaging, a transport system coupled to the loading station, the transport system configured to transport the one or more flexible packaging, a fitment station coupled to the transport system and configured to store strip fitments, the fitment station having an outlet in communication with the transport system at a first end, the first end of the outlet configured to dispense the stored strip fitments, and an first engagement member communicatively coupled to and substantially aligned with the outlet, the first engagement member configured to operate in cooperation with the outlet, forming a stripper, wherein the stripper is configured so that the first engagement member interfaces with the stored strip fitments and strips the stored strip fitments one at a time, coincident with a dispense of each stripped strip fitment, effected by the first engagement member extending through the outlet, and at least partial insertion of each stripped strip fitment into a respective flexible packaging, and a clamp defining a reference point and coupled to the transport system, the clamp configured to secure the respective flexible packaging with the at least partially inserted stripped strip fitment to the transport system, a separator coupled to one of the clamp or the transport system, the separator configured to interface with each respective flexible packaging to separate and open a portion of each respective flexible packaging, wherein a second engagement member, configured to further insert each at least partial inserted stripped strip fitment, interfaces with the at least partial inserted stripped strip fitment fully inserting the at least partial inserted stripped strip fitment to the reference point of the clamp.

In accordance with one or more aspects of the disclosed embodiment a method of mounting a hold open fitment to flexible packaging is provided. The method including storing more than one hold open fitment within a frame, positioning the flexible packaging relative to the frame, engaging and biasing at least one edge of one hold open fitment with an engagement member so that the one hold open fitment is singulated from the more than one hold open fitments, and issuing the singulated hold open fitment through a dispenser outlet into the flexible packaging substantially simultaneously with singulation of the singulated hold open fitment.

In accordance with one or more aspects of the disclosed embodiment the method further comprises loading one or more flexible packaging within a flexible packaging positioning system.

In accordance with one or more aspects of the disclosed embodiment the method further comprises transporting the one or more flexible packaging relative to the frame with the flexible packaging positioning system.

In accordance with one or more aspects of the disclosed embodiment the method further comprises separating the flexible packaging, with a separator of the flexible packaging positioning system, for insertion of the singulated hold open fitment.

In accordance with one or more aspects of the disclosed embodiment the method further comprises providing stability for insertion of the singulated hold open fitment by clamping the flexible packaging with a clamp mechanism coupled to the frame.

In accordance with one or more aspects of the disclosed embodiment the method further comprises actuating the engagement member between a first and second position to engage and bias the at least on edge.

In accordance with one or more aspects of the disclosed embodiment the method further comprises sealing the singulated hold open fitment within the flexible packaging.

In accordance with one or more aspects of the disclosed embodiment the hold open fitment comprises a flexible configuration variable between a first un-distended shape and a second stably distended shape.

In accordance with one or more aspects of the disclosed embodiment a method of mounting a strip fitment to flexible packaging is provided. The method including loading one or more flexible packaging within a loading station, transporting the flexible packaging from the loading station, to a fitment station, with a transport station, storing more than one strip fitment within the fitment station, positioning the flexible packaging relative to the frame, engaging and biasing at least one edge of one strip fitment with an engagement member so that the one strip fitment is singulated from the more than one strip fitments, and issuing the singulated strip fitment through a dispenser outlet into the flexible packaging substantially simultaneously with singulation of the singulated strip fitment.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

The invention claimed is:

1. A fitment mounting apparatus for mounting a hold open fitment to flexible packaging, wherein the hold open fitment has a flexible configuration variable between a first undistended shape and a second stably distended shape, the apparatus comprising:
   a frame forming a holder configured for holding more than one of the hold open fitments within the holder;
   a flexible packaging positioning system arranged for positioning flexible packaging for mounting the hold open fitment to the flexible packaging; and
   an applicator coupled to the frame configured to engage engaging at least one edge of the hold open fitment in the holder and biasing the at least one edge so that the hold open fitment is singulated, from others of the more than one hold open fitments in the holder, and issued from the holder into the flexible packaging on the flexible packaging positioning system substantially simultaneous with singulation.

2. The apparatus of claim 1, wherein the applicator comprises a actuator and a fitment dispenser coupled to the frame.

3. The apparatus of claim 2, wherein the actuator includes an actuated member having a contact surface, the contact surface configured to engage the at least one edge of the hold open fitment, and wherein actuation of the actuator provides the bias of the at least one edge, and provides dispensing of the hold open fitment from the holder through the fitment dispenser to issue the hold open fitment into the flexible packaging.

4. The apparatus of claim 3, wherein the contact surface of the actuated member is angled.

5. The apparatus of claim 2, wherein the fitment dispenser is orientated so that the hold open fitment issues from the fitment dispenser in a direction that effects insertion of the hold open fitment into the flexible packaging.

6. The apparatus of claim 3, wherein the frame includes a fitment seat configured to engage another edge of the hold open fitment, opposite the at least one edge biased by the actuator.

7. The apparatus of claim 6, wherein the frame includes a fitment stop configured to stop the hold open fitment in a position for issue into the flexible packaging.

8. The apparatus of claim 7, wherein the fitment seat and the fitment stop are positioned to form a gap therebetween, the gap sized and shaped substantially conformal to a dimension of no more than one hold open fitment and the gap admitting passage of no more than one hold open fitment through the gap so that the hold open fitment biased at the at least one edge is simultaneous singulated and issued.

9. The apparatus of claim 3, wherein the actuated member is movably coupled to the frame, the actuated member configured to move between a first position and a second position in a direction the hold open fitment issues from the fitment dispenser.

10. The apparatus of claim 9, wherein the actuated member in the first position is disposed so that an offset hold open fitment in the holder is movable within the holder to align the at least one edge of the hold open fitment with the contact surface of the actuator.

11. The apparatus of claim 9, wherein the actuated member in the second position is extended through the fitment dispenser so that the hold open fitment is issued and at least partially inserted into the flexible packaging.

12. A fitment applicator comprising:
    a frame configured to store storing strip fitments, the frame having an outlet configured to dispense the stored strip fitments;
    a support communicatively coupled to a first end of the outlet, and supporting a container the support configured to support a container; and
    an engagement member communicatively coupled to a second end of the outlet aligned opposite the first end, the engagement member configured to operate operating in cooperation with the outlet, forming a stripper,
    wherein the stripper is configured to interfaces with the stored strip fitments and strips the stored strip fitments one at a time, coincident with each stripped strip fitment being dispensed through the first end of the outlet and inserted into a respective container.

13. The fitment applicator of claim 12, wherein an opening on at least one side of the container is unsealed so that a separator flares the opening along a full opening width.

14. The fitment applicator of claim 12, wherein the engagement member interfaces with the stored strip fitments and strips the stored strip fitments one at a time.

15. The fitment applicator of claim 12, wherein the engagement member dispenses the stripped strip fitment through the first end of the outlet.

16. The fitment applicator of claim 12, wherein the engagement member is angled such that the stripped strip fitment is dispensed at an angle.

17. The fitment applicator of claim 12, wherein the outlet is configured such that no more than a single stripped strip fitment passes through the outlet at a time.

18. The fitment applicator of claim 12, wherein the outlet and support are configured such that each stripped strip fitment being inserted into the respective container is substantially coincident with the stripped strip fitment dispensing from the outlet.

19. The fitment applicator of claim 12, wherein the strip fitments are stored in a substantially vertical configuration.

20. The fitment applicator of claim 12, wherein the strip fitments are stored in a substantially horizontal configuration.

21. The fitment applicator of claim 12, wherein the stripper is configured such that interface with the stored strip fitments occurs with a single strip fitment at a time.

22. The fitment applicator of claim 12, wherein the stripper is sized and shaped so that it is substantially complementary to an engagement edge of the stored strip fitments, wherein during interface with the stored strip fitment, the stripper contacts the engagement edge of a single strip fitment without contacting any adjacent stored strip fitment.

23. The fitment applicator of claim 12, wherein the stripper is configured such that each stripped strip fitment is partially inserted into the container.

24. The fitment applicator of claim 12, wherein the fitment applicator further comprises a pressure plate configured to provide a substantially consistent contact between the transport system and the containers.

25. The fitment applicator of claim 12, wherein the fitment applicator further comprises a vacuum separator configured to interface with the containers.

26. The fitment applicator of claim 12, wherein the fitment applicator further comprises a guide rail configured to interface with at least one of the containers or the stripped strip fitment.

27. The fitment applicator of claim 12, wherein the fitment applicator further comprises a sealing mechanism configured to seal the stripped strip fitment into the container.

* * * * *